US009951810B2

(12) United States Patent
Parmeter et al.

(10) Patent No.: US 9,951,810 B2
(45) Date of Patent: Apr. 24, 2018

(54) ELECTRICAL SUBMERSIBLE MOTOR RADIAL SUPPORT BEARING

(71) Applicant: Summit ESP, LLC, Tulsa, OK (US)

(72) Inventors: Larry James Parmeter, Broken Arrow, OK (US); Jeffrey G. Frey, Broken Arrow, OK (US); Brett D. Leamy, Claremore, OK (US)

(73) Assignee: Summit ESP, LLC, Tulsa, OK (US)

( * ) Notice: Subject to any disclaimer, the term of this patent is extended or adjusted under 35 U.S.C. 154(b) by 0 days.

(21) Appl. No.: 15/410,556

(22) Filed: Jan. 19, 2017

(65) Prior Publication Data
US 2017/0204904 A1 Jul. 20, 2017

Related U.S. Application Data

(60) Provisional application No. 62/280,898, filed on Jan. 20, 2016.

(51) Int. Cl.
H02K 5/16 (2006.01)
F16C 23/08 (2006.01)
H02K 5/132 (2006.01)
F16C 19/38 (2006.01)
F16C 33/36 (2006.01)
F16C 27/04 (2006.01)

(52) U.S. Cl.
CPC ............ *F16C 23/086* (2013.01); *F16C 19/38* (2013.01); *F16C 27/04* (2013.01); *F16C 33/36* (2013.01); *H02K 5/132* (2013.01); *F16C 2380/26* (2013.01)

(58) Field of Classification Search
CPC ........ F16C 33/36; F16C 19/38; F16C 23/086; H02K 5/132

USPC .......................................................... 310/90
See application file for complete search history.

(56) References Cited

U.S. PATENT DOCUMENTS

| 3,170,646 A | 2/1965 | Springer |
| 3,261,182 A | 7/1966 | Allen et al. |
| 3,279,216 A * | 10/1966 | Spaulding, Jr. ......... F16D 3/185 |
| | | 464/154 |
| 3,613,395 A | 10/1971 | Shigeura |
| 3,975,117 A | 8/1976 | Carter |

(Continued)

FOREIGN PATENT DOCUMENTS

GB 2264548 A 9/1993
JP 03129128 A 3/1991

*Primary Examiner* — Hanh Nguyen
(74) *Attorney, Agent, or Firm* — Frederic Dorwart, Lawyers PLLC; Penina Michlin Chiu

(57) ABSTRACT

An electric submersible motor radial support bearing is described. An electric submersible motor includes a motor shaft extending longitudinally through a stator bore, the motor shaft bendable out of alignment with a longitudinal axis of the stator bore, a carrier keyed the stator bore, each rotor section of the motor separated from an adjacent rotor section by a roller bearing including a rounded roller cage between a rotatable inner race and a non-rotatable outer race, the inner race inward of the roller cage and rotatably secured to the motor shaft, the outer race having a curved inner diameter (ID) forming a roller cage socket, an outer diameter (OD) of the outer race non-rotatably secured to an ID of the carrier, the roller cage and outer race forming a spheroidal joint as the roller cage pivots off the longitudinal axis of the stator bore as the motor shaft bends.

8 Claims, 19 Drawing Sheets

(56) References Cited

U.S. PATENT DOCUMENTS

| | | | |
|---|---|---|---|
| 4,018,062 A | | 4/1977 | Bulliot |
| 4,913,681 A | | 4/1990 | Green |
| 5,209,577 A | | 5/1993 | Swatek |
| 5,224,898 A | | 7/1993 | Johnson et al. |
| 5,549,393 A | * | 8/1996 | Morando .............. B21B 39/008 384/203 |
| 5,722,812 A | | 3/1998 | Knox et al. |
| 5,911,630 A | | 6/1999 | Shigeura |
| 6,167,965 B1 | | 1/2001 | Bearden et al. |
| 6,238,096 B1 | * | 5/2001 | Allen .................... F16C 23/082 384/495 |
| 6,283,869 B1 | | 9/2001 | Spensberger |
| 6,780,037 B1 | | 8/2004 | Parmeter |
| 6,956,310 B1 | * | 10/2005 | Knox .................... H02K 5/132 310/87 |
| 7,575,413 B2 | | 8/2009 | Semple et al. |
| 7,611,338 B2 | | 11/2009 | Swatek et al. |
| 7,810,586 B2 | | 10/2010 | Cousins et al. |
| 8,684,679 B2 | | 4/2014 | Tetzlaff et al. |
| 8,894,350 B2 | | 11/2014 | Brunner et al. |
| 9,325,216 B2 | | 4/2016 | Parmeter et al. |
| 9,353,752 B2 | | 5/2016 | Tetzlaff et al. |
| 2004/0202393 A1 | * | 10/2004 | Masui .................... F16C 19/48 384/495 |
| 2011/0037332 A1 | * | 2/2011 | Neuroth ................. F16C 17/04 310/87 |
| 2012/0098358 A1 | * | 4/2012 | Prieto .................... F04D 29/044 310/51 |
| 2014/0370995 A1 | | 12/2014 | Collins et al. |
| 2015/0132158 A1 | * | 5/2015 | Reeves .................. F04B 35/04 417/410.1 |
| 2015/0240879 A1 | | 8/2015 | Takagi et al. |
| 2016/0115998 A1 | | 4/2016 | Jayaram et al. |

\* cited by examiner

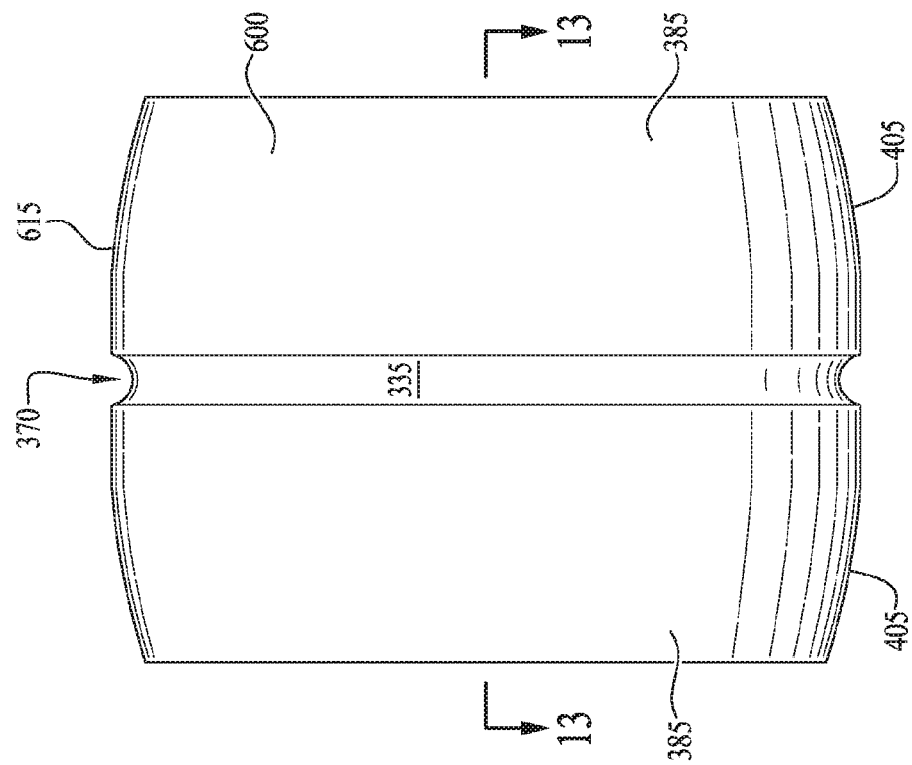
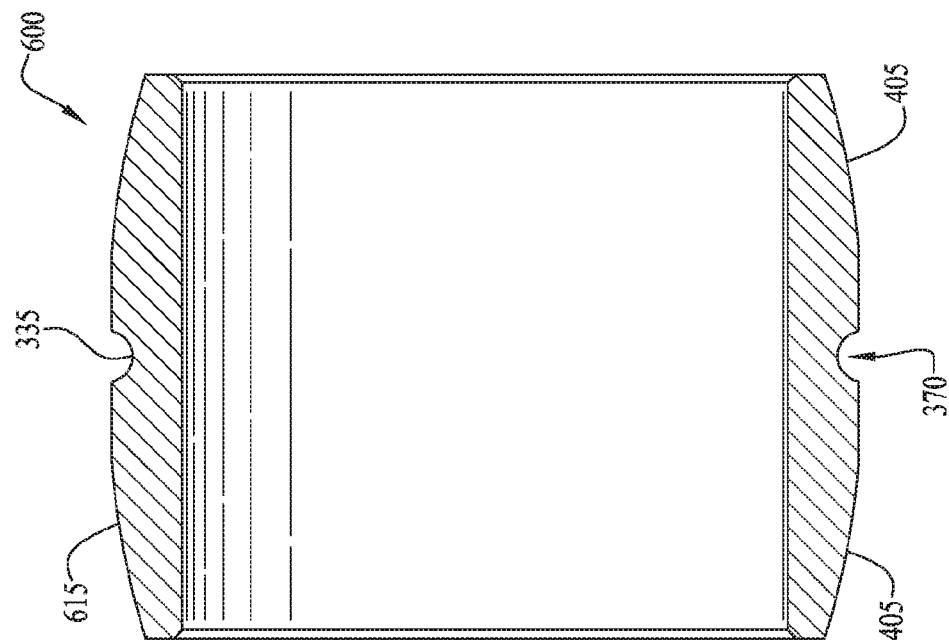

ELECTRICAL SUBMERSIBLE MOTOR RADIAL SUPPORT BEARING

CROSS REFERENCE TO RELATED APPLICATIONS

This application claims the benefit of U.S. Provisional Application No. 62/280,898 to Parmeter et al., filed Jan. 20, 2016 and entitled "ELECTRICAL SUBMERSIBLE PUMP ASSEMBLY RADIAL SUPPORT BEARING," which is hereby incorporated by reference in its entirety.

BACKGROUND OF THE INVENTION

1. Field of the Invention

Embodiments of the invention described herein pertain to the field of electric submersible pump (ESP) assemblies. More particularly, but not by way of limitation, one or more embodiments of the invention enable an electric submersible motor radial support bearing.

2. Description of the Related Art

Electric motors convert electrical energy into mechanical energy to produce linear force or torque and are used in many applications requiring mechanical power, such as pumps. In the case of an electric submersible pump (ESP), a multi-phase electric motor is typically used in conjunction with a centrifugal pump to lift fluid, such as oil or water, to the surface of a well. In particular, an ESP motor is typically a two-pole, three-phase, squirrel cage induction motor. The two-pole design conventionally runs at 3600 rpm synchronous speed at 60 Hz power. These electric motors include a stationary component known as a stator, and a rotating component known as the motor shaft. In ESP applications, the stator is energized by a power source located at the well surface and connected to the stator with an electric cable. The electricity flowing through the stator windings generates a magnetic field, and the motor shaft rotates in response to the magnetic field created in the energized stator. A rotor secured to the shaft rotates within the stator. The length of the shaft in ESP motors is long: typically between twenty-seven and thirty-two feet in length, although these shafts can potentially range anywhere from five to forty feet. To accommodate the length of the shaft in ESP applications, the rotor is divided into sections. The length of the wound stator determines the number of rotor sections.

Rotor sections are spaced apart from one another, and a stator bearing is located between each rotor section for maintaining the shaft in axial alignment. These radial support bearings are sometimes interchangeably referred to as "motor bearings", "rotor bearings" or "stator bearings." The stator bearings are non-rotating bearings that fit snuggly inside the stator bore. Conventional stator bearings are shaped like a hollow cylinder, with two parallel walls that extend on the inner diameter (ID) and outer diameter (OD) of the bearing. The outer wall is of constant radius and compressed against the stator bore. Typically, stator bearings do not rotate, but are permitted axial movement to accommodate thermal expansion during operation. Bearing sleeves are conventionally paired with the conventional stator bearings. Bearing sleeves are keyed to the shaft and rotate with the shaft inside the stator bearings. The stator bearings prevent the rotors from making contact with the stator bore. The motor is filled with high dielectric oil, which lubricates the bearings and transfers heat. Thus, these conventional bearings are hydrodynamic.

FIG. 1 illustrates a conventional stator bearing of the prior art. As shown in FIG. 1, conventional stator bearing 1000 is an annular cylinder. Conventional bearing outer diameter 1200 would be compacted against the stator bore with conventional anti-rotational tabs 1150 that lock conventional stator bearing 1000 to the stator of the ESP motor, although axial movement of conventional stator bearing 1000 may be permitted. Conventional bronze sleeve 1050 rotates inside conventional stator bearing 1000. A conventional key 1100 may lock conventional sleeve 1050 with the ESP motor shaft (not shown) that would extend through conventional sleeve 1050.

A plurality of stator bearings support the rotors on the common shaft. This arrangement is generally referred to as "a rotor stack". The rotor stack is nested inside a stator that completes the inner workings of the motor. The motor shaft ultimately couples with a pump, or series of pumps, which drives the pump to produce fluid to the surface. In the case of an ESP motor, the motor is typically coupled from bottom to top, to a seal section (motor protector), intake and centrifugal pump. In some instances such as in gassy wells, a gas separator or charge pump may also be included in the assembly. Each section of the ESP assembly has a central shaft. The shafts are all attached, typically by spline, such that as the motor shaft rotates, all the shafts rotate.

ESPs have been in use for nearly a century and little has changed mechanically from the historical design. Most improvements have been in the nature of better wire insulation, lubrication and bearing materials. Historical design, however, does not support the modern trend toward directional drilling, which causes bends in downhole wells. In directional drilling, the drill bit may be realigned from a traditional vertical direction to a horizontal direction to reach larger pockets of oil or other desirable resources. To reach resources in a horizontal direction the degree of the bend of the hole should be large enough to allow the ESP equipment to pass through without any yielding of flanges, bolts or housings. However, in some cases the exact depth and true distance to the bend required is unknown in advance. Unexpectedly, the ESP equipment may be required to bend more than the conventional tolerance (not to be exceeded) of 10 degrees/100 feet. A bend greater than 10 degrees/100 feet will almost certainly destroy the stator bearings, which may cause motor failure. As the motor shaft is forced to bend, the bending causes side loading at the rotor producing up to 400 pounds of side load on the stator bearings, leading to bearing failure.

Other components of ESP assemblies suffer from the same problem, for example radial support bearings in the seal section, in the pump or in stages, during installation of the assembly or whilst the assembly is operating, depending on which section of the ESP assembly settles in the bend.

As is apparent from the above, currently available ESP assemblies are not engineered to support modern wells that contain bends. Therefore, there is a need for an improved electric submersible motor radial support bearing to increase the bend tolerance of ESP assemblies beyond 10°/100 feet.

BRIEF SUMMARY OF THE INVENTION

One or more embodiments of the invention enable an electric submersible motor radial support bearing.

An electric submersible motor radial support bearing is described. An illustrative embodiment of an electric submersible motor includes a series of rotor sections rotatably coupled to a motor shaft, the motor shaft extending longitudinally through a stator bore, the stator bore having a keyway and a longitudinal axis, the motor shaft bendable out of alignment with the longitudinal axis, a carrier secured to the stator bore by a key protruding from the carrier and mated to the keyway, a particular rotor section of the series of rotor sections separated from an adjacent rotor section by a roller bearing, the roller bearing including a rounded roller cage between a rotatable inner race and a non-rotatable outer race, the inner race inward of the roller cage and rotatably secured to the motor shaft, the outer race having a curved inner diameter forming a roller cage socket, an outer diameter of the outer race non-rotatably secured to an inner diameter of the carrier, the roller cage and outer race forming a spheroidal joint as the roller cage pivots off the longitudinal axis of the stator bore as the motor shaft bends. In some embodiments, the outer diameter of the outer race includes at least one circumferential groove, and wherein an elastomeric ring is seated in each of the at least one circumferential grooves. In certain embodiments, the outer diameter of the outer race includes a first circumferential groove proximate a top of the outer race, and a second circumferential groove proximate a bottom of the outer race, and an elastomeric ring seated in each of the first and second circumferential grooves. In some embodiments, the outer diameter of the outer race is non-rotatably secured to the inner diameter of the carrier by at least one elastomeric ring. In certain embodiments, the key is a spring-loaded key. In some embodiments, the stator bore includes two keyways spaced 180° apart, and the carrier includes two corresponding keys, one key of the two corresponding keys mated to each keyway. In some embodiments, the rounded roller cage includes a plurality of rollers and a pair of hemispheres, each hemisphere of the pair of hemispheres having an outer diameter that curves inward as the outer diameter extends away from a roller cage equator. In certain embodiments, the outer race friction fit to the carrier. In some embodiments, there are a plurality of the roller bearings and each rotor section of the series of rotor sections is separated from an adjacent rotor section by one of the roller bearings.

An illustrative embodiment of an electric submersible motor includes a series of rotor sections rotatably coupled to a motor shaft, the motor shaft extending longitudinally through a stator bore, the stator bore having a keyway and a longitudinal axis, the motor shaft bendable out of alignment with the longitudinal axis, a carrier secured to the stator bore by a key protruding from the carrier and mated to the keyway, a particular rotor section in the series of rotor sections separated from an adjacent rotor section by a bearing set, the bearing set including a rotatable sleeve secured to the motor shaft, and a non-rotatable bushing inward of the carrier and outward of the rotatable sleeve, the non-rotatable bushing having a rounded outer diameter secured to an inner diameter of the carrier by friction, the rounded outer diameter curving inward as the outer diameter extends away from a bushing equator, the rounded outer diameter of the non-rotatable bushing rockable along the inner diameter of the carrier as the motor shaft bends out of alignment with the longitudinal axis of the stator bore. In some embodiments, the rounded outer diameter of the non-rotatable bushing includes a circumferential groove around the bushing equator and an elastomeric ring seated in the groove. In some embodiments, an elastomeric ring around the rounded outer diameter of the non-rotatable bushing provides the friction securing the rounded outer diameter of the bushing to the inner diameter of the carrier. In certain embodiments, the key is a spring-loaded key. In some embodiments, the stator bore includes two keyways spaced 180° apart, and the carrier includes two corresponding keys, one key of the two corresponding keys mated to each keyway. In certain embodiments, there are a plurality of the bearing sets, and each rotor section of the series of rotor sections is separated from an adjacent rotor section by one of the bearing sets.

An illustrative embodiment of an electric submersible pump (ESP) assembly includes a radial support bearing coupled to an ESP assembly shaft, the radial support bearing including an equator between two hemispheres, each hemisphere having a rounded outer diameter that curves inward as the outer diameter extends away from the equator, the radial support bearing rockable along the curved outer diameter to align with a bend of the ESP assembly shaft. In some embodiments, the ESP assembly shaft is a motor shaft. In certain embodiments, the ESP assembly shaft is a seal section shaft. In some embodiments, the radial support bearing is a roller bearing in an ESP motor, the roller bearing including a rotatable roller cage including the two hemispheres, the rotatable roller cage pivotable within an outer race, the outer race within a carrier keyed to a stator bore of the motor, the outer race and roller cage forming a spheroidal joint as the roller cage pivots off a longitudinal axis of the stator bore as the ESP assembly shaft bends. In some embodiments, the tapered bearing is a non-rotatable bushing of a hydrodynamic bearing set, the non-rotatable bushing including the pair of hemispheres. In some embodiments, the non-rotating bushing is located in one of a motor head or a motor base. In certain embodiments the ESP assembly includes a plurality of the tapered radial support bearings, wherein a first bearing of the plurality of tapered bearings is a roller bearing located between rotor sections in an ESP motor, and a second bearing of the plurality of tapered bearings is a hydrodynamic bushing located in one of a head or a base of the ESP motor.

An illustrative embodiment of an electric submersible motor includes a bearing including a non-rotating bushing having a curved outer diameter, the curved outer diameter symmetric about an equator of the outer diameter, the equator of the bushing having a circumferential groove, an elastomeric ring seated in the circumferential groove, and a sleeve inwards of the bushing and keyed to a rotatable motor shaft. In some embodiments the electric submersible motor further includes a stator bore including a keyway, a carrier secured to the stator bore by a key mated to the keyway, the non-rotating bushing secured against an inner diameter of the carrier, and the elastomeric ring sandwiched between the carrier and the non-rotating bushing. In some embodiments, the electric submersible motor includes one of a motor head or a motor base including a housing, the bushing secured against the housing, and the elastomeric ring sandwiched between the housing and the bushing. In some embodiments, the rotatable motor shaft is operatively coupled to a multistage centrifugal pump.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments of the invention will be more apparent from the following more particular description thereof, presented in conjunction with the following drawings wherein:

FIG. 13 is a cross-sectional view across line 13-13 of FIG. 14 of a rounded bushing of an illustrative embodiment.

FIG. 14 is a side elevation view of a rounded bushing of an illustrative embodiment.

Figure 1:
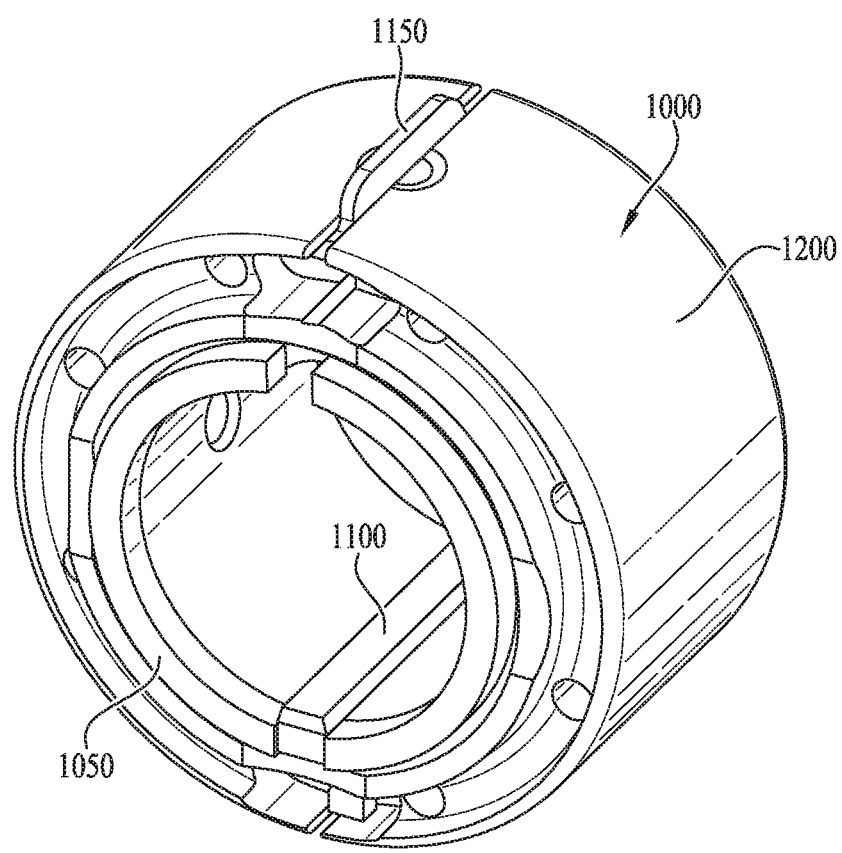
FIG. 1 is a perspective view of a stator bearing of the prior art.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

An electric submersible motor radial support bearing will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a bearing includes one or more bearings.

This specification makes use of a cylindrical coordinate system, where the origin is at the center of the electric submersible pump (ESP) motor shaft, and the length of an un-bent (straight) shaft corresponds to the longitudinal axis. As used herein, an "axial" surface of a bearing runs substantially parallel to the longitudinal axis of the shaft. A radial surface is substantially perpendicular to the longitudinal axis of the shaft.

"Coupled" refers to either a direct connection or an indirect connection (e.g., at least one intervening connection) between one or more objects or components. The phrase "directly attached" means a direct connection between objects or components.

As used herein, the term "outer" or "outward" means the radial direction away from the center of a shaft of the ESP assembly and/or the aperture of a component through which an ESP assembly shaft would extend. In the art, "outer diameter" (OD) and "outer circumference" are sometimes used equivalently. As used herein, the outer diameter is used to describe what might otherwise be called the outer circumference of an ESP assembly component such as a motor bearing. Furthermore, "outer diameter" is also sometimes used to refer more liberally to the outer surface of a component.

As used herein, the term "inner" or "inward" means the radial direction towards the center of the shaft of the ESP motor and/or the aperture of a component through which the motor shaft would extend. In the art, "inner diameter" (ID) and "inner circumference" are sometimes used equivalently. As used herein, the inner diameter is used to describe what might otherwise be called the inner circumference of a pump component, such as a motor bearing. Furthermore, "inner diameter" is also sometimes used to refer more liberally to the inner surface of a component.

As used herein, the term "stationary" refers to an ESP assembly component that does not rotate during operation of the ESP assembly, although in this context axial movement may be possible of a stationary component.

Illustrative embodiments provide a self-aligning bearing for use in electric submersible motors, ESP motor protectors and/or ESP pumps. For ease of description and so as not to obscure the invention, illustrative embodiments are described in terms of an electric submersible motor of an ESP assembly employed in a downhole pumping embodiment, nothing herein is intended to limit the invention to that embodiment. While illustrative embodiments primarily describe pumping oil, water and/or gas, nothing so limits the invention described herein. Illustrative embodiments provide a self-leveling bearing that isolates the ESP assembly shaft from the surrounding components (e.g., stator bore, motor head, motor base, diffuser, seal housing) as applicable, through a bend of up to 15° per hundred feet of arc of the shaft. Without limiting the foregoing and so as not to obscure the invention, illustrative embodiments are primarily described in terms of motor bearings but the invention is not so limited. Illustrative embodiments may be equally applied to radial support bearings in a seal section or ESP pump.

The bearing of illustrative embodiments may provide radial support to an ESP assembly shaft through at least a fifteen degree bend over 100 feet of arc, which may increase the bend tolerance of conventional ESP assemblies by fifty percent (from 10°/100 feet to 15°/100 feet). The radial support bearing of illustrative embodiments may indirectly surround the ESP shaft subjected to a bend. For example, the radial support bearing may be stationary and paired with an inward rotatable sleeve, or may be rotatable and outwards of an inner race. The radial support bearing may include a rounded outer diameter that allows the rounded bearing to rock and/or pivot as the shaft bends. In hydrodynamic bearing set embodiments, the movement may be rocking similar to a runner of a rocking chair or a cradle. In roller bearing embodiments, the roller cage and outer race may form a spheroidal joint as the roller cage pivots off the longitudinal axis of the stator bore as the motor shaft bends. The bearing of illustrative embodiments may be rounded symmetrically about the equator of the bearing with a circumference that decrease away from the equator and/or shaped like a sphere with its ends cut off by two parallel planes.

The alignment of the rounded bearing may adjust with respect to the stator bore as the rounded bearing rocks along its OD, allowing the bearing to self-align with a bending shaft through a tight bend, which may provide radial support without failing due to edge loading. The radial support bearing of illustrative embodiments may be a hydrodynamic bearing or a roller bearing. In hydrodynamic bearing embodiments, the stationary bushing may include a rounded OD that is cradled by the stator bore, carrier, motor head and/or motor base, depending on the location of the bearing. In roller bearing embodiments, the roller cage may be spherical, rotatable and cradled by a stationary outer race having a curved inner diameter. The outer race and/or stationary bushing may be secured to a carrier. The carrier may be keyed to the stator bore with one or more spring-loaded keys. Illustrative embodiments may reduce side and/or edge loading on radial support bearings in ESP applications, which may increase the life of the bearings and the ESP assembly.

Figure 2A:
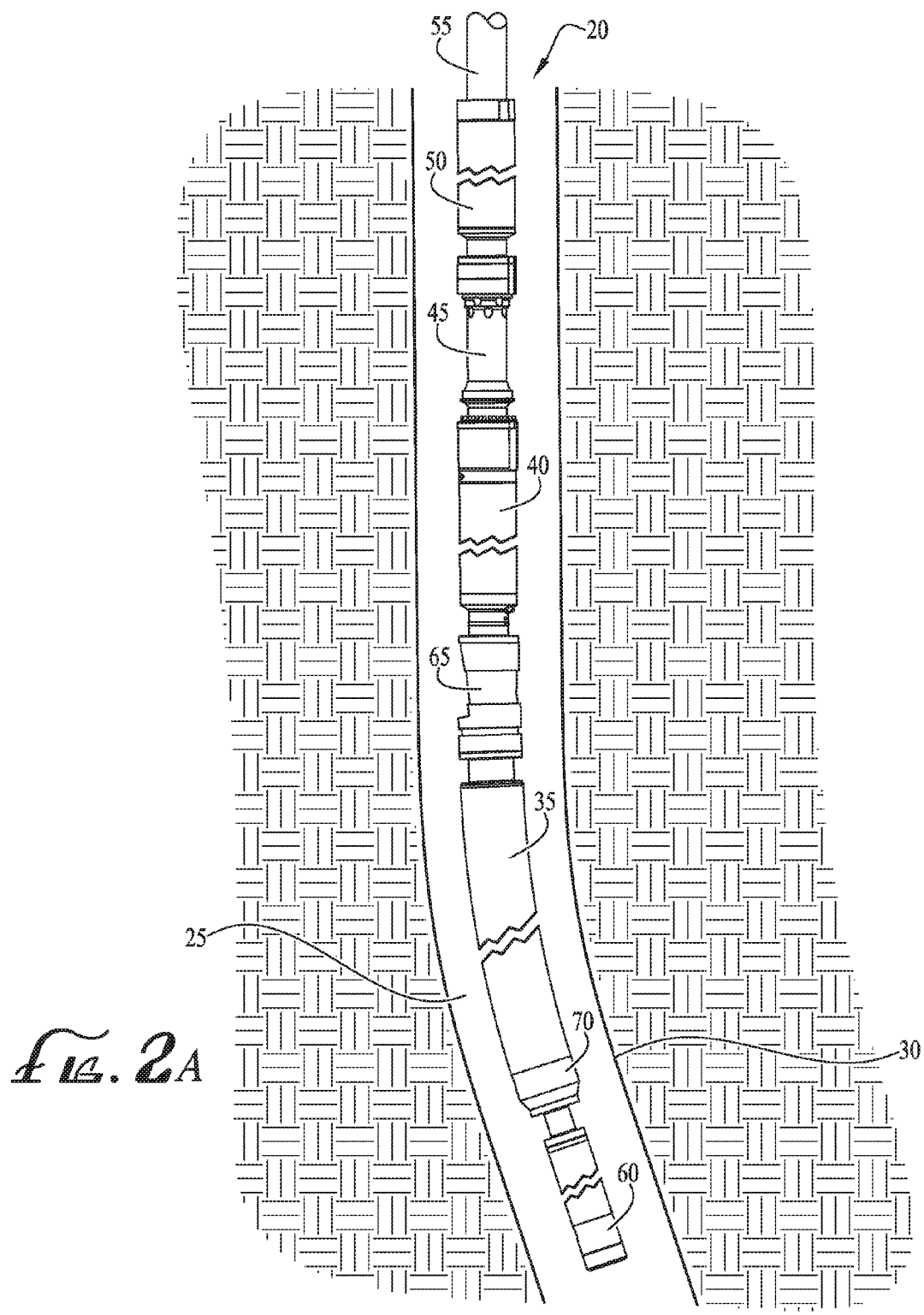
FIG. 2A is a perspective view of a bent electric submersible pump (ESP) assembly.

FIG. 2A illustrates an exemplary ESP assembly downhole in a well with a bend of fifteen degrees per one-hundred feet. As shown in FIG. 2A, ESP assembly 20 has been deployed in downhole well 25, which contains well bend 30. Well 25 may contain a bend (deflection) from vertical towards a horizontal orientation due to subsurface features, composition, location of deposits, and other factors well known in the art. The currently available hydrodynamic rotor bearings commonly used in ESP applications typically tolerate a bend of no more than 10°/100 feet, greatly limiting their ability to be used in curved wells. In FIG. 2A, ESP motor 35 is operating within well bend 30, causing motor 35 to also bend. Well bend 30 of illustrative embodiments may be up to 15° per 100 feet.

Figure 2B:
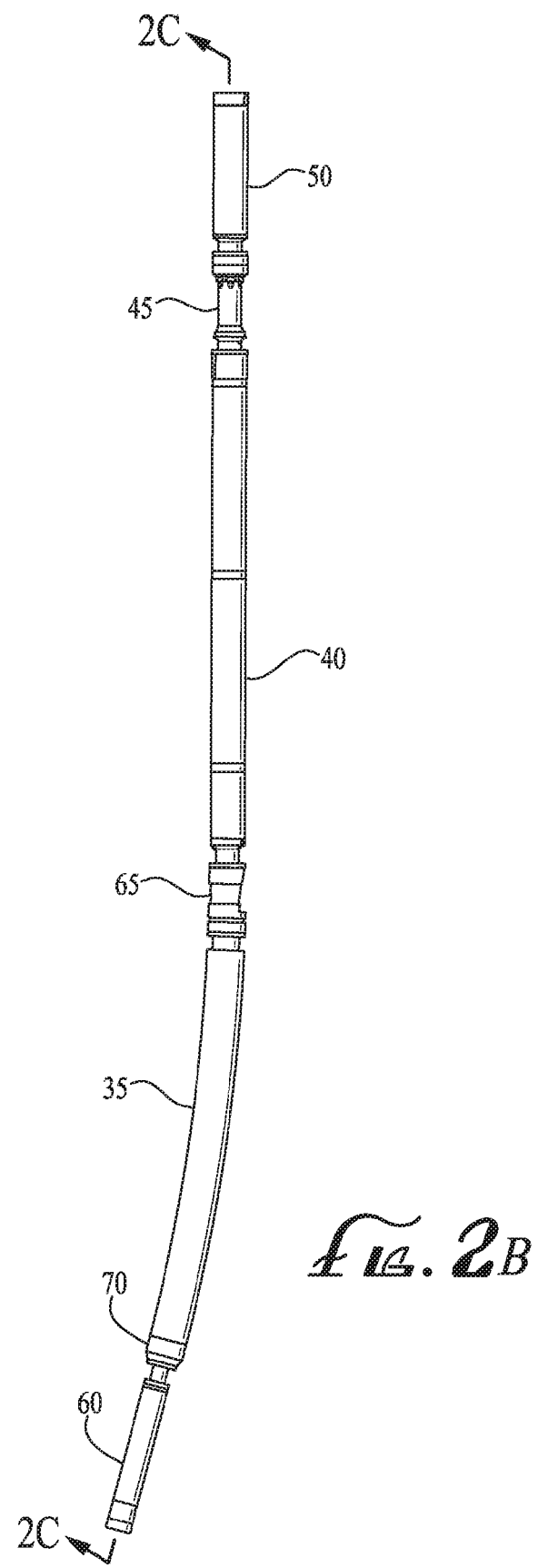
FIG. 2B is a perspective view of a bent ESP assembly.
Figure 2C:
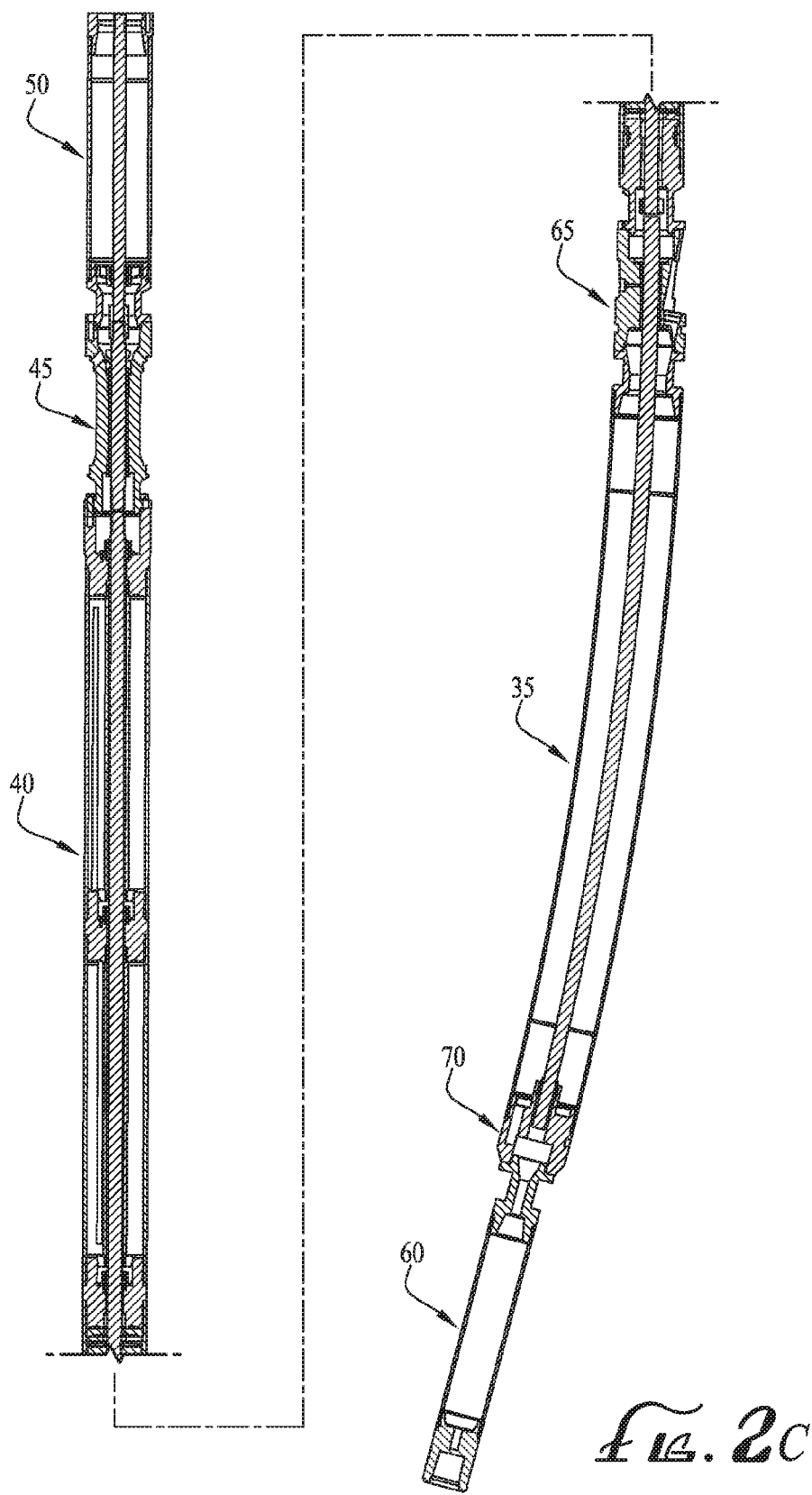
FIG. 2C is a cross-sectional view across line 2C-2C of FIG. 2B of a bent ESP of an illustrative embodiment.

As shown in FIGS. 2A-2C, motor 35 may be a two-pole, three-phase squirrel cage induction motor between about five and forty feet in length. As shown in FIGS. 2A-2C, motor includes motor head 65 and motor base 70, with downhole sensors 60 below motor base 70. Motor protector 40 may protect motor 35 from the ingress of well fluid, provide separation between well fluid and motor oil, and may provide pressure equalization. In FIG. 2C, a three-chamber motor protector 40 in a labyrinth-mechanical seal—labyrinth configuration is illustrated. Intake 45 may serve as the intake for well fluid into ESP pump 50. ESP pump 50 may be a multi-stage centrifugal pump having stacked impeller and diffuser stages that lift well fluid to the surface of the well or to a collection location through production tubing 55. ESP motor 35, motor protector 40, intake 45 and ESP pump 50 all may include shafts. ESP motor 35 rotates the motor shaft, which in turn rotates the shafts of motor protector 40, intake 45 and ESP pump 50, which shafts are all connected together such as by spline. Each ESP assembly shaft may be long—between five and five-hundred feet long—and subject to side loading upon exposure to well bend 30. Each ESP assembly shaft may include radial support bearings to assist in keeping the shafts in axial alignment. Alignment of the rotating shafts is critical to the proper operation and efficiency of the ESP assembly component, such as the motor, seal or pump. For example, if a motor shaft becomes misaligned, motor 35 may fail.

In ESP motor embodiments, while yield strength of the material used for the rotor and stator bore may be one limiting factor, the primary concern is a bend that may cause a rotor section to rub against the stator bore. Most ESP motors have 0.02-0.045 inch-per-side clearance between the stator and rotor sections, which allows critical passage of lubrication (high dielectric oil) throughout the motor. The motor shaft may still operate where it passes through a severe "dog leg" if the rotors make only light contact with the stator bore, but if lubrication is blocked or the contact creates friction, then the motor cannot operate for long before failure will occur.

A novel idea to solve this problem for the ESP industry is to replace the commonly used conventional hydrodynamic rotor bearings shaped like annular cylinders, instead with specially designed rounded, self-leveling bearings in order to allow the motor to operate in a much tighter bend, and thus better support well geometries caused by horizontal drilling techniques. The specific design of the rounded bearing of illustrative embodiments may depend upon the amount of clearance space available for the bearing. For example, most ESP motors have 0.02-0.045 inch-per-side of clearance between the stator and rotors. In such instances, rather than a hydrodynamic bearing, a roller bearing design may be employed. If there is enough clearance space for a roller bearing, such a design may be preferable to a hydrodynamic style bearing because the inventors have observed that roller bearings are better at handling side loads than the commonly used conventional hydrodynamic bearings.

Figure 3:
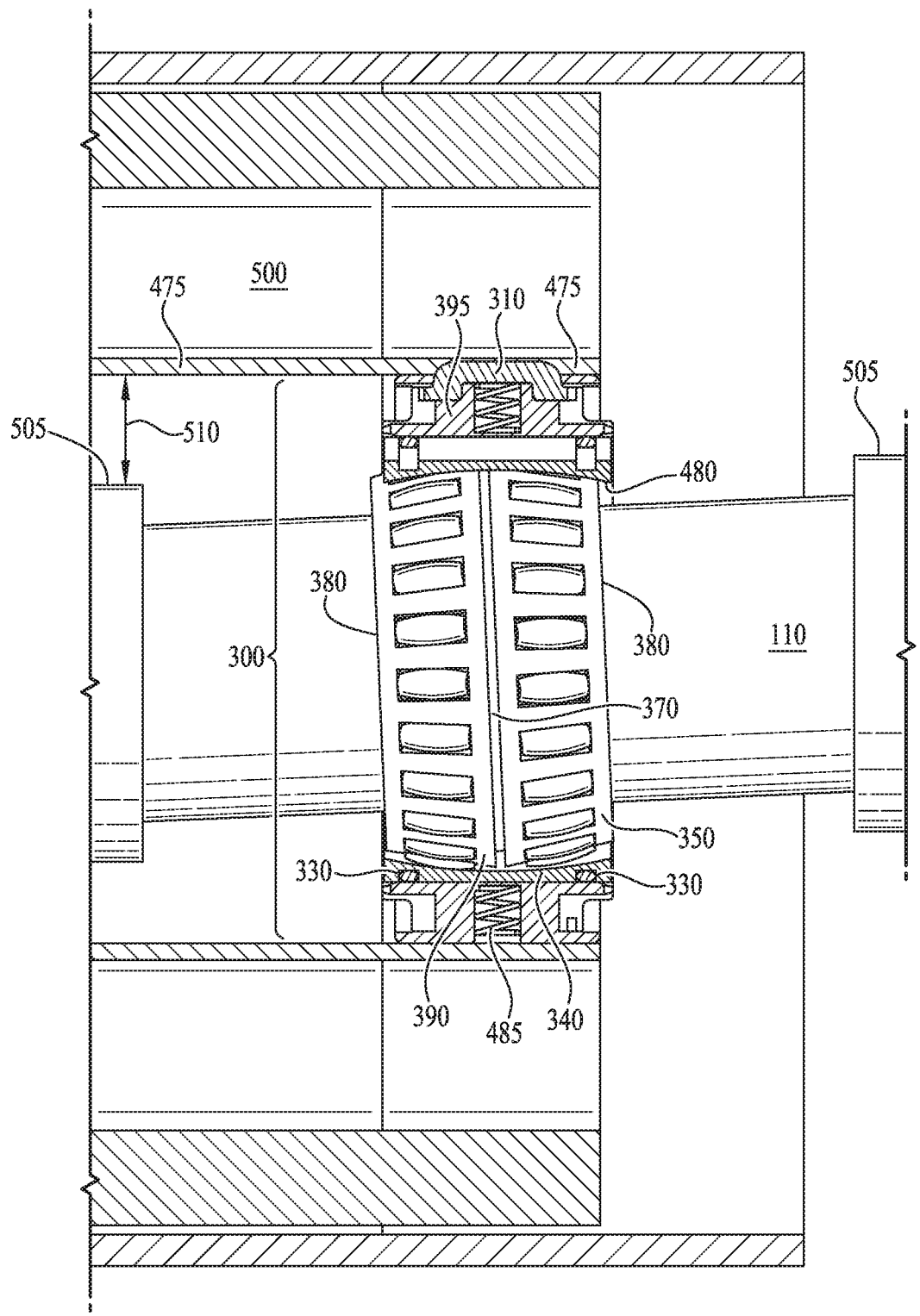
FIG. 3 is a cross sectional view of a radial support bearing of an illustrative embodiment in an ESP motor with a bent shaft.
Figure 5:
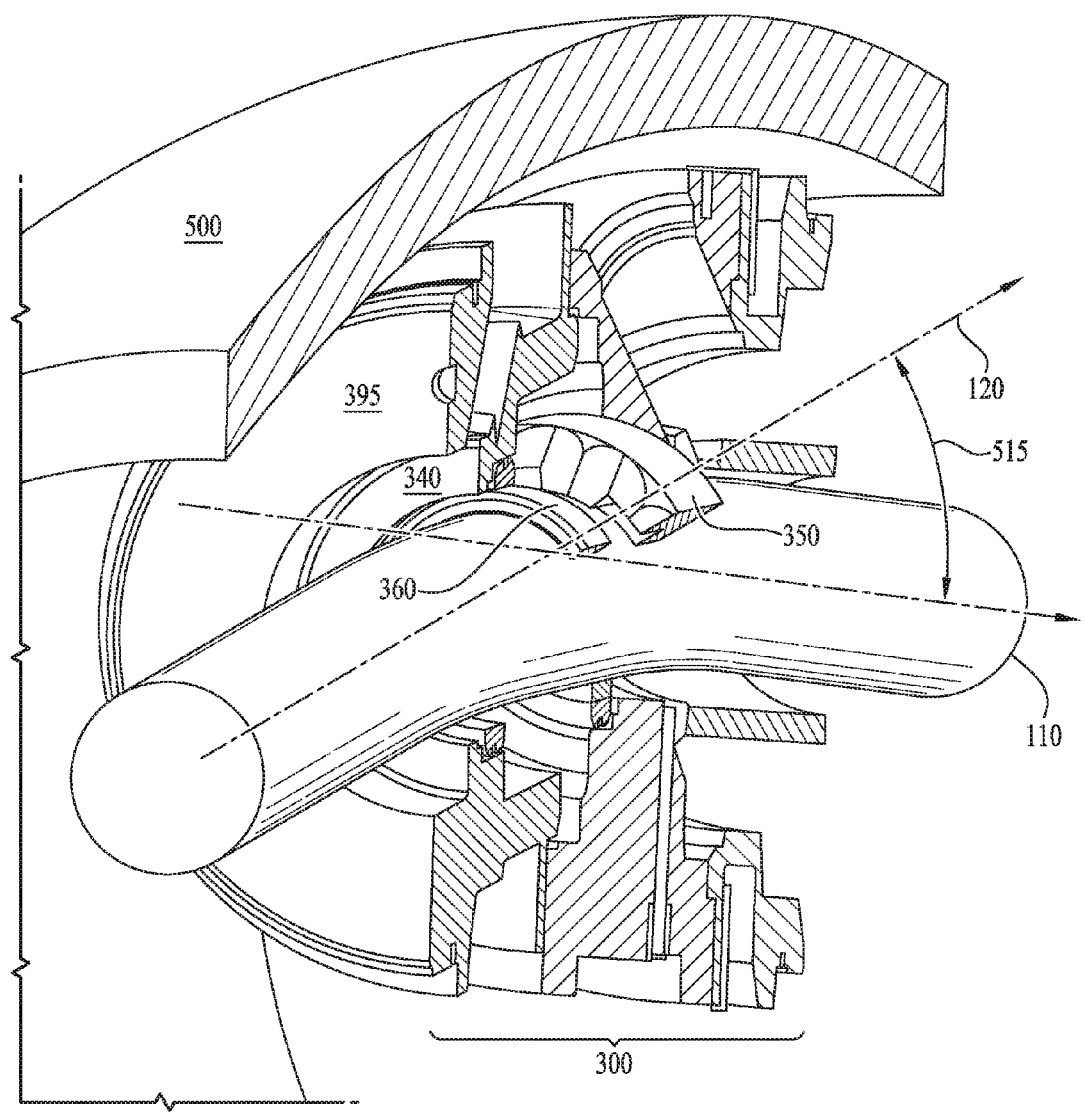
FIG. 5 is a partial cross sectional view of a bent shaft having a radial support bearing of an illustrative embodiment.
Figure 6A:
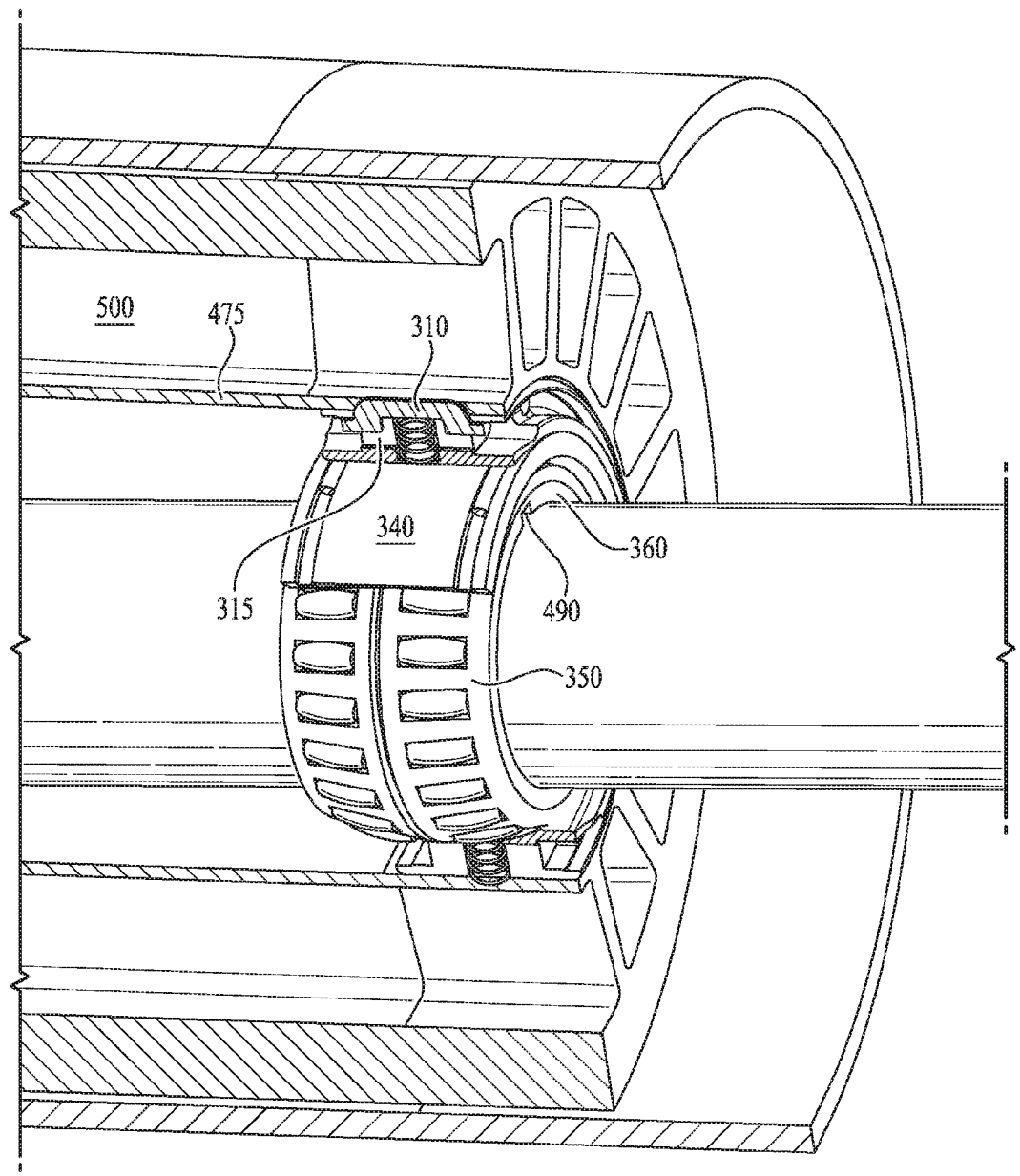
FIG. 6A is a cross-sectional view of an ESP motor with a roller bearing of an illustrative embodiment.

FIG. 3 and FIG. 6A illustrate a section of an electric submersible motor of an illustrative embodiment. In FIG. 3, an exemplary roller bearing of an illustrative embodiment is employed as a stator bearing between two adjacent rotor sections 505, with clearance 510 of about 0.02-0.045 inches between a rotor section 505 and stator 500. As shown in FIG. 3, motor shaft 110 may be separated from stator bore 500 by self-aligning (self-leveling) bearing 300 of an illustrative embodiment. The rotor stack may include a plurality of rotor sections 505 with rotor bearings between them on common shaft 110. Common shaft 110 may bend up to 15° per hundred-feet from longitudinal axis 120 (shown in FIG. 5) defined by stator 500 bore. Shaft 110 may bend without failure when supported by self-aligning bearing 300.

Figure 7:
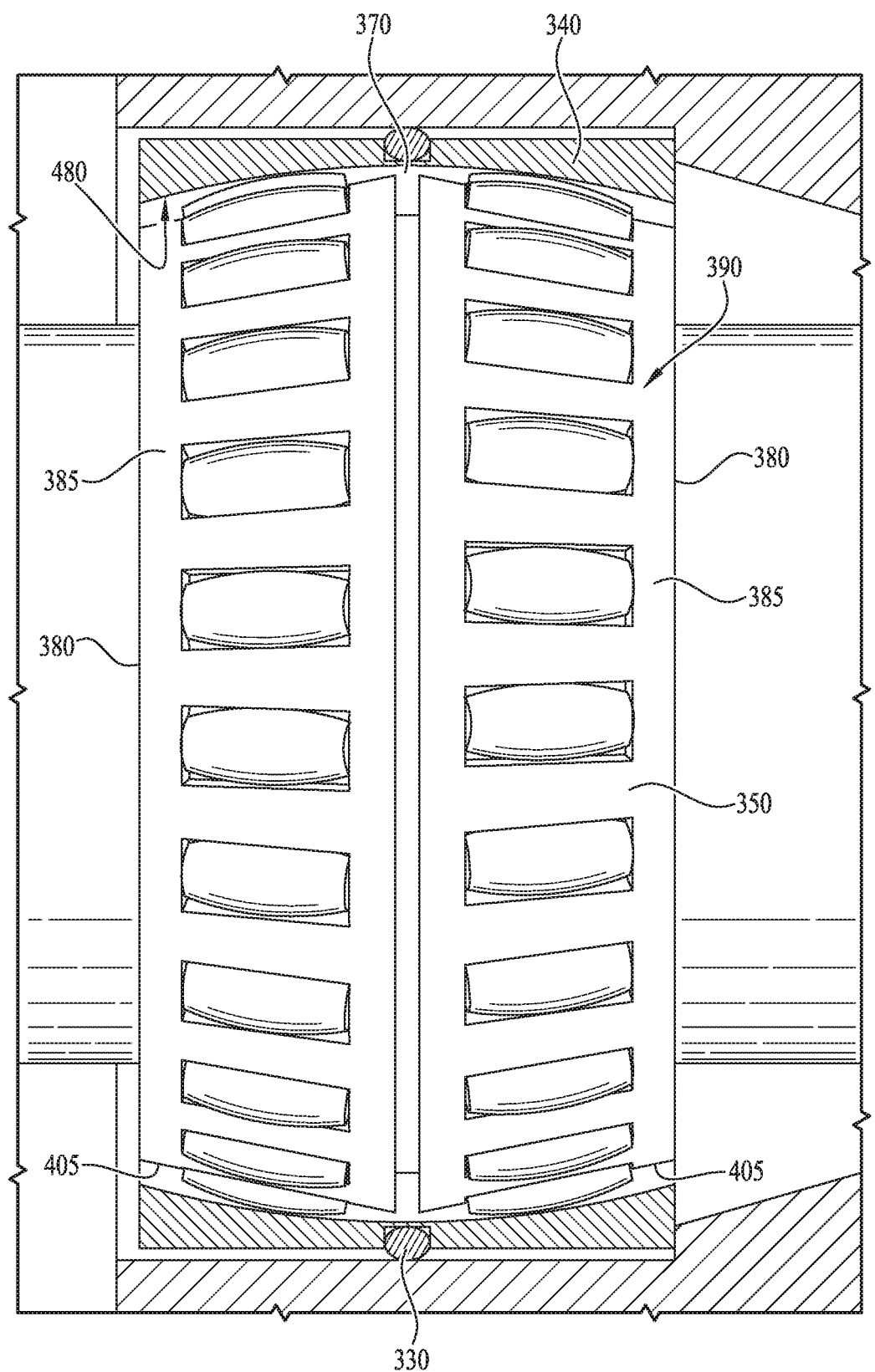
FIG. 7 is a cross sectional view of a radial support bearing of an illustrative embodiment.

As shown in FIG. 7, self-aligning bearing 300 may include a rounded, tapered and/or "spherical" roller cage 350. Although referred to herein as "spherical", the shape of roller cage 350 may be a hollow cylinder with a tapered OD 390 and/or have OD 390 shaped like a sphere but with its two ends cut off by two parallel planes. Unlike a traditional hollow cylinder bearing, the circumference (distance around the outer diameter) of roller cage 350 may be largest proximate equator 370 and decrease in both upward and downward directions symmetrically away from equator 370 to form inward taper 405. Roller cage 350 may comprise two hemispheres 385, each having edge 380 with a smaller circumference than proximate equator 370. Roller cage OD 390 may taper and/or curve inwards as roller cage OD 390 extends away from equator 370, forming inward taper 405. The effect is a roller cage with rounded OD 390. Rounding of roller cage OD 390 may be at a slope of about 0.15 degrees-per-foot for a deflection tolerance of 15° per hundred-feet.

Figure 4:
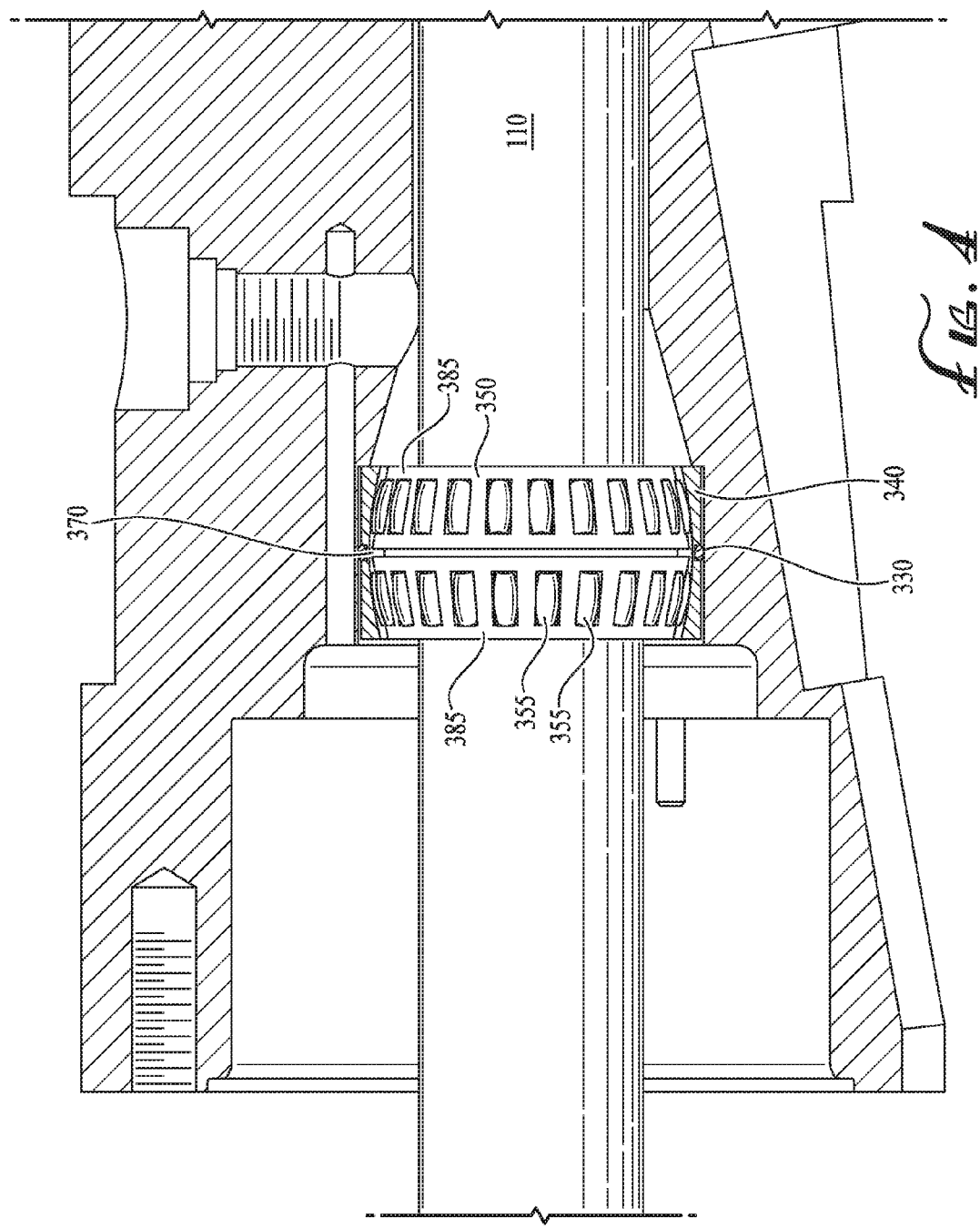
FIG. 4 is a cross sectional view of a radial support bearing of an illustrative embodiment in an ESP assembly with a straight shaft.
Figure 8:
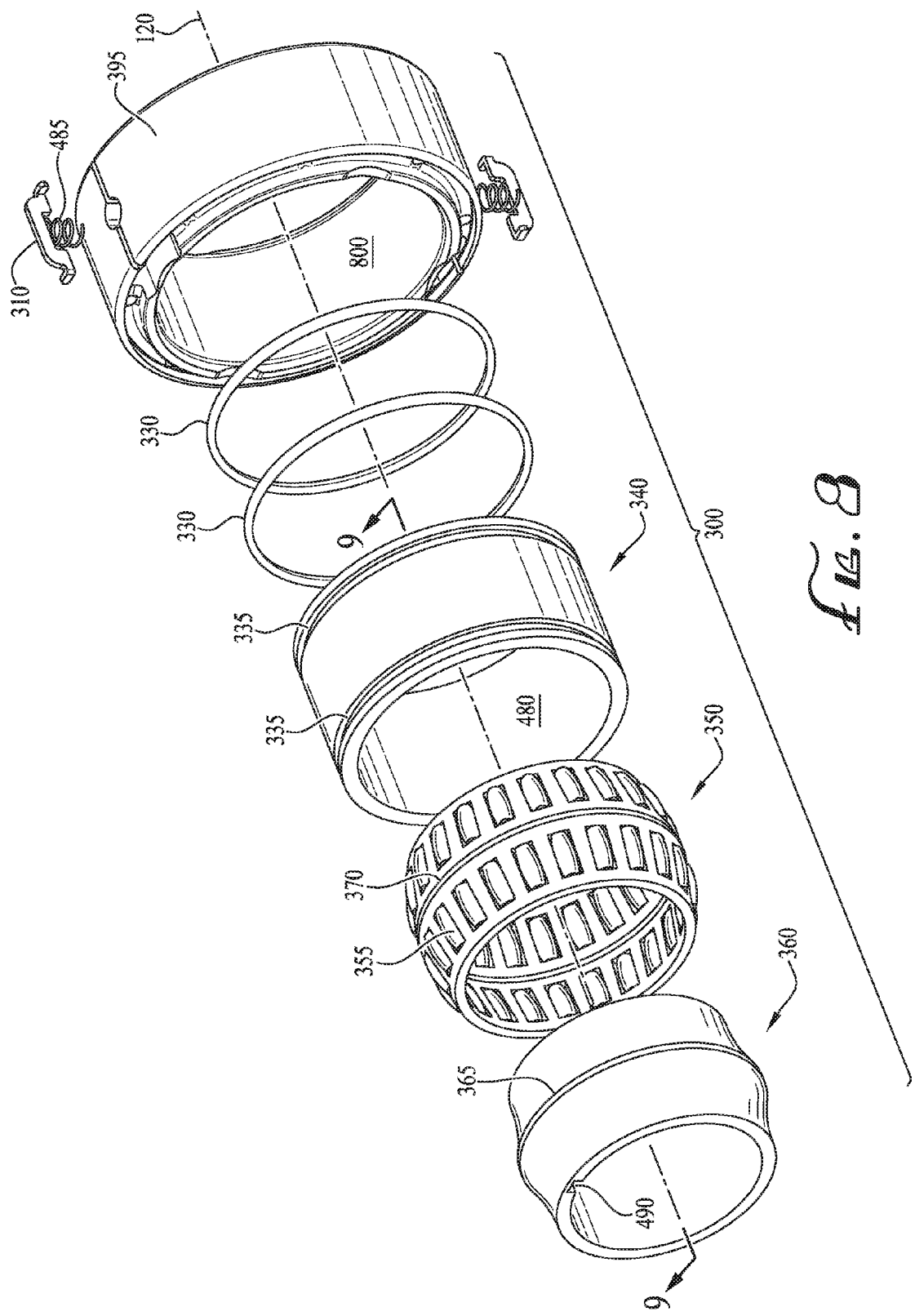
FIG. 8 is an exploded view of a radial support bearing of an illustrative embodiment.

Turning to FIG. 8, roller cage 350 may surround inner race 360. Inner race 360 may be keyed to motor shaft 110, rotating with motor shaft 110. Rollers 355 of roller cage 350 may rotate within roller cage 350 by virtue of contact with inner race 360. Roller cage 350 may also rotate, although roller cage 350 may not rotate at the same speed as motor shaft 110, since roller cage 350 may not be keyed to shaft 110. Roller cage 350 may rock and/or pivot inside outer race 340. Outer race 340 may remain stationary during operation of ESP motor 35 by friction fit with carrier 395. Carrier 395 may be secured into stator 500 by one or more carrier keys 310 fit into respective keyways 475 (shown in FIG. 3) in stator bore 500. In one example, carrier 395 may include two keys 310 set one-hundred-eighty degrees apart. Keyway 475 may run the length of stator, allowing carrier 395 axial movement along stator 500, but preventing rotation of carrier 395. Keys 310 may be spring compressed, where spring 485 may force key 310 into stator keyway 475. Once the rotor stack 505 is placed within stator 500, keys 310 may pop into keyways 475 by rotating shaft 110 slightly during deployment. Outer race 340 may include one or more grooves 335 in which elastomeric rings 330 may be seated. In the example shown in FIG. 3, an elastomeric ring 330 may be seated on each top and bottom edge of outer race 340. In the example of FIG. 4, a single elastomeric ring 330 may be placed at the center of outer race 340. Elastomeric rings 330 may swell during operation of ESP motor 35 and may prevent outer race from rotating with motor shaft 110. Elastomeric ring 330 may be a synthetic rubber such as ethylene propylene diene monomer (EPDM).

Figure 16A:
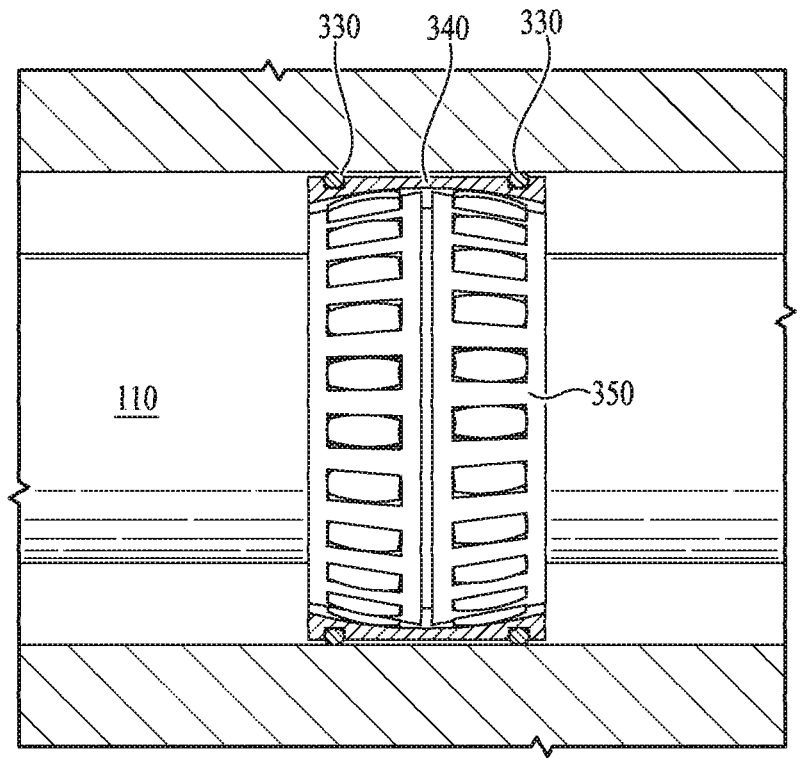
FIG. 16A is a cross sectional view of a roller bearing of an illustrative embodiment around a straight shaft.
Figure 16B:
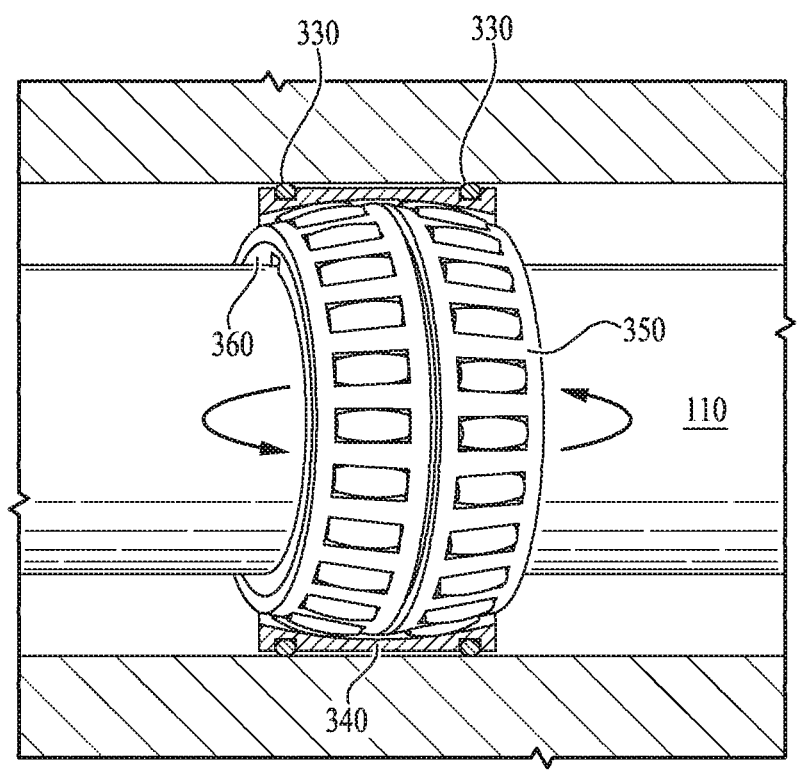
FIG. 16B is a cross sectional view of a roller bearing of an illustrative embodiment pivoting to self-align with a shaft bend.
Figure 16C:
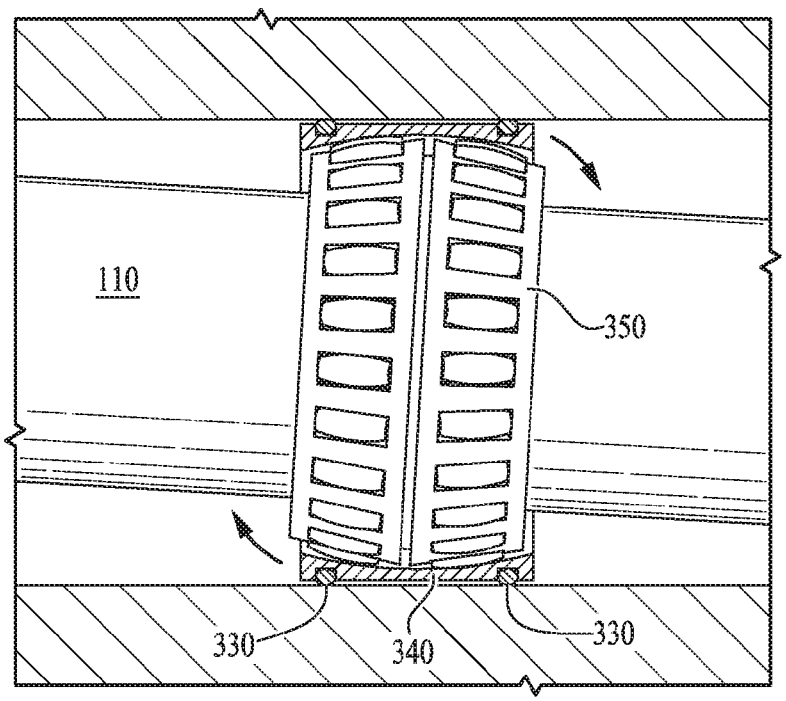
FIG. 16C is a cross sectional view of a roller bearing of an illustrative embodiment rocking to self-align with a shaft bend.
Figure 16D:
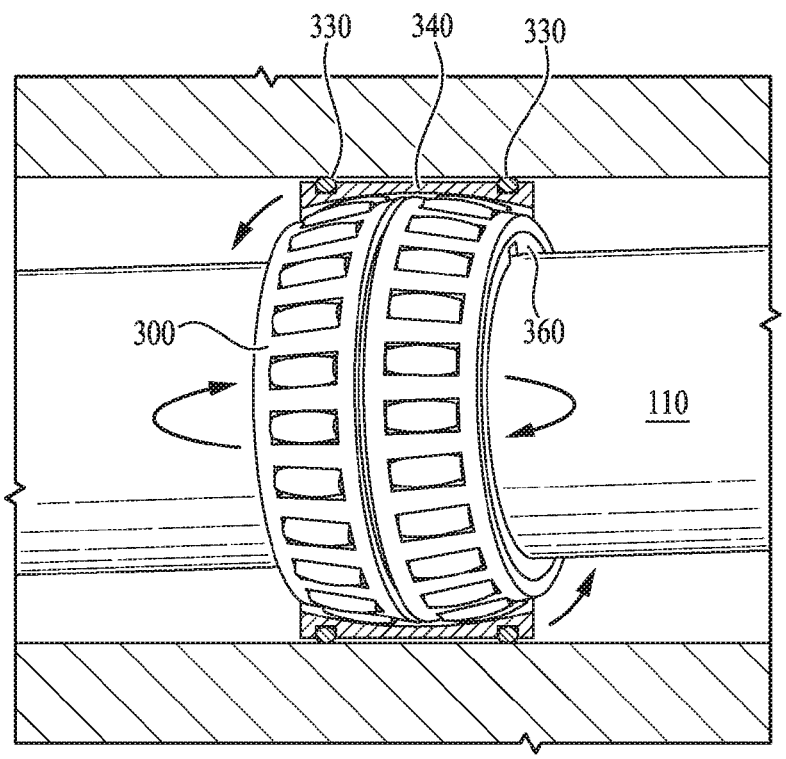
FIG. 16D is a cross sectional view of a roller bearing of an illustrative embodiment rocking and pivoting to self-align with a shaft bend.

Returning to FIG. 7, outer race ID 480 may be rounded and form a socket for rounded roller cage 350. Together outer race ID 480 and roller cage 350 may form a ball and socket joint (spheroidal joint) that may permit roller cage 350 to move around an indefinite number of axes with up to 15° per one-hundred feet degrees of motion. The slope of outer race ID 480 may complement rounded surface 390. Outer race ID 480 may curve inwards extending away from equator 370 forming a cup-like socket. Outer race ID 480 may cradle roller cage 350 as it rocks, pivots, turns, rolls and/or spins in response to well bend 30. FIGS. 16A-16D illustrate the spheroidal joint type motion of roller cage 350 inside outer race ID 480. FIG. 16A illustrates roller cage 350 on a straight shaft 110. FIG. 16B illustrates roller cage 350 that has pivoted into and out of the plane of the page in response to deflection of shaft 110 in same direction. FIG. 16C illustrates roller cage 350 that has rocked downwards to the right in response to deflection of shaft 110 in same direction. FIG. 16D shows Roller cage 350 that has both pivoted and rocked with shaft 110 deflection. As shown in FIGS. 16B-16D, outer race 340 does not rock or pivot, but instead remains aligned with stator bore 500, housing 605 (shown in FIG. 12) and/or carrier 395, acting as a socket for roller cage 350.

FIG. 5 illustrates self-aligning bearing 300 with a roller cage 350 that has pivoted in response to a bent shaft 110. FIG. 5 shows motor shaft 110 of an illustrative embodiment with shaft bend 515 of fifteen degrees per one-hundred feet from longitudinal axis 120. Longitudinal axis 120 may extend centrally through the bore of stator 500. When shaft 110 is straight, the axis of rotation of shaft 110 may be aligned with longitudinal axis 120. As shaft 110 deflects, a portion of shaft 110 may curve away from longitudinal axis 120, as for example shown in FIG. 5. FIG. 5 illustrates how self-aligning bearing 300 may keep common shaft 110 from contacting stator 500 bore while supporting shaft bend 515 of shaft 110.

Figure 9:
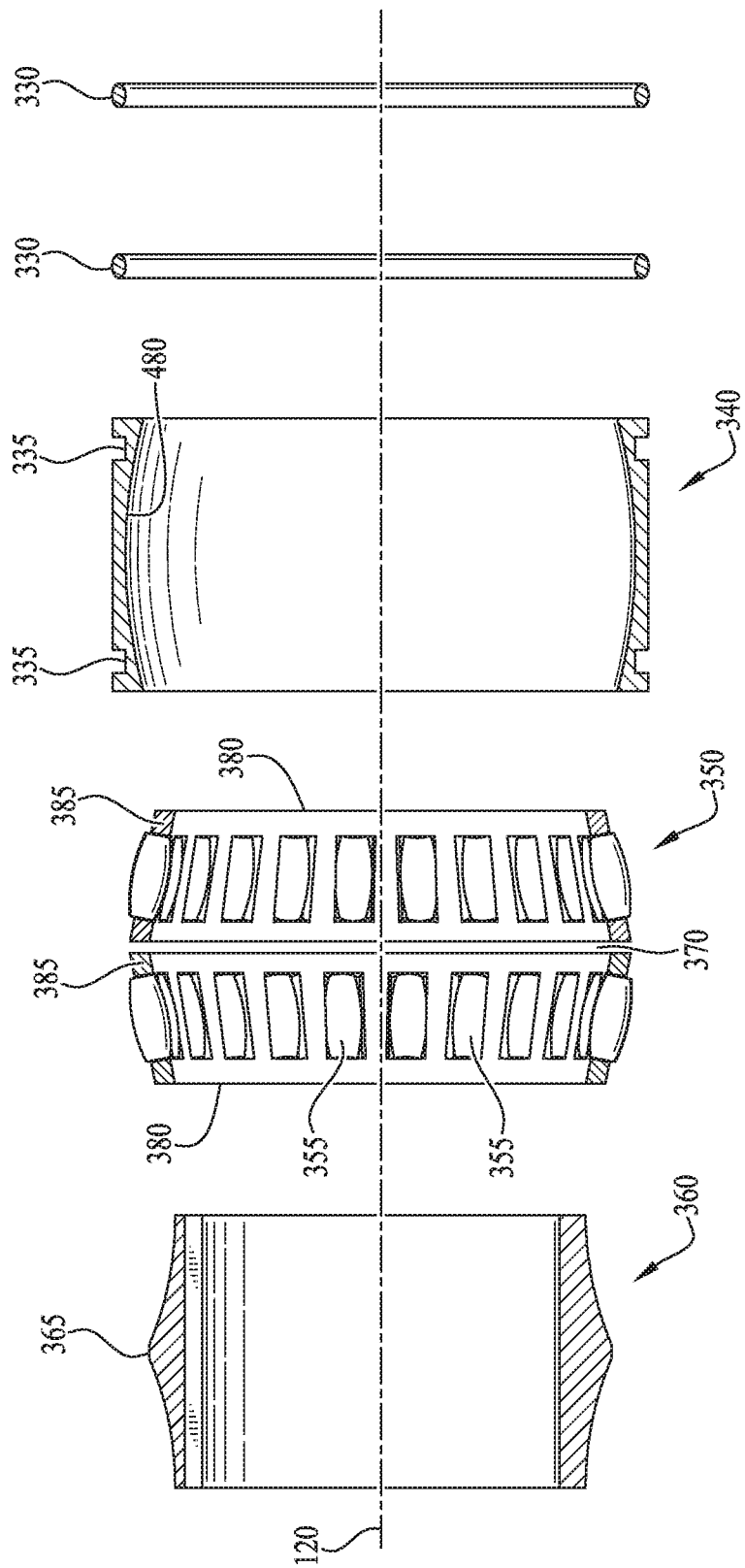
FIG. 9 is a cross sectional view across line 9-9 of the radial support bearing of FIG. 8 of an illustrative embodiment.

FIG. 9 perhaps best illustrates the profiles of illustrative bearing components. As shown in FIG. 9, inner race 360 may include central flare 365 on an outer diameter, which central flare 365 may mate and/or engage with equator 370 of roller cage 350. Central flare 365 may assist in maintaining a connection between inner race 360 and roller cage 350 despite pivoting and/or rocking of roller cage 350. Inner race 360 may include an inner race keyway 490 (shown in FIG. 8), which may key inner race 360 to shaft 110. Curved outer race ID 480 may cradle and/or serve as a socket for roller cage 350 as roller cage 350 rocks, turns and/or pivots in response to shaft bend 515. At least one elastomeric ring 330, seated into groove 335 in outer race 340 OD, may keep outer race 340 from direct frictional contact with carrier 395 (shown in FIG. 8) when self-aligning bearing 300 is fully assembled. The OD of carrier 395 may vary depending on the radial load anticipated for common shaft 110. Carrier 395 may act as an adapter sleeve for roller cage 350.

Figure 10:
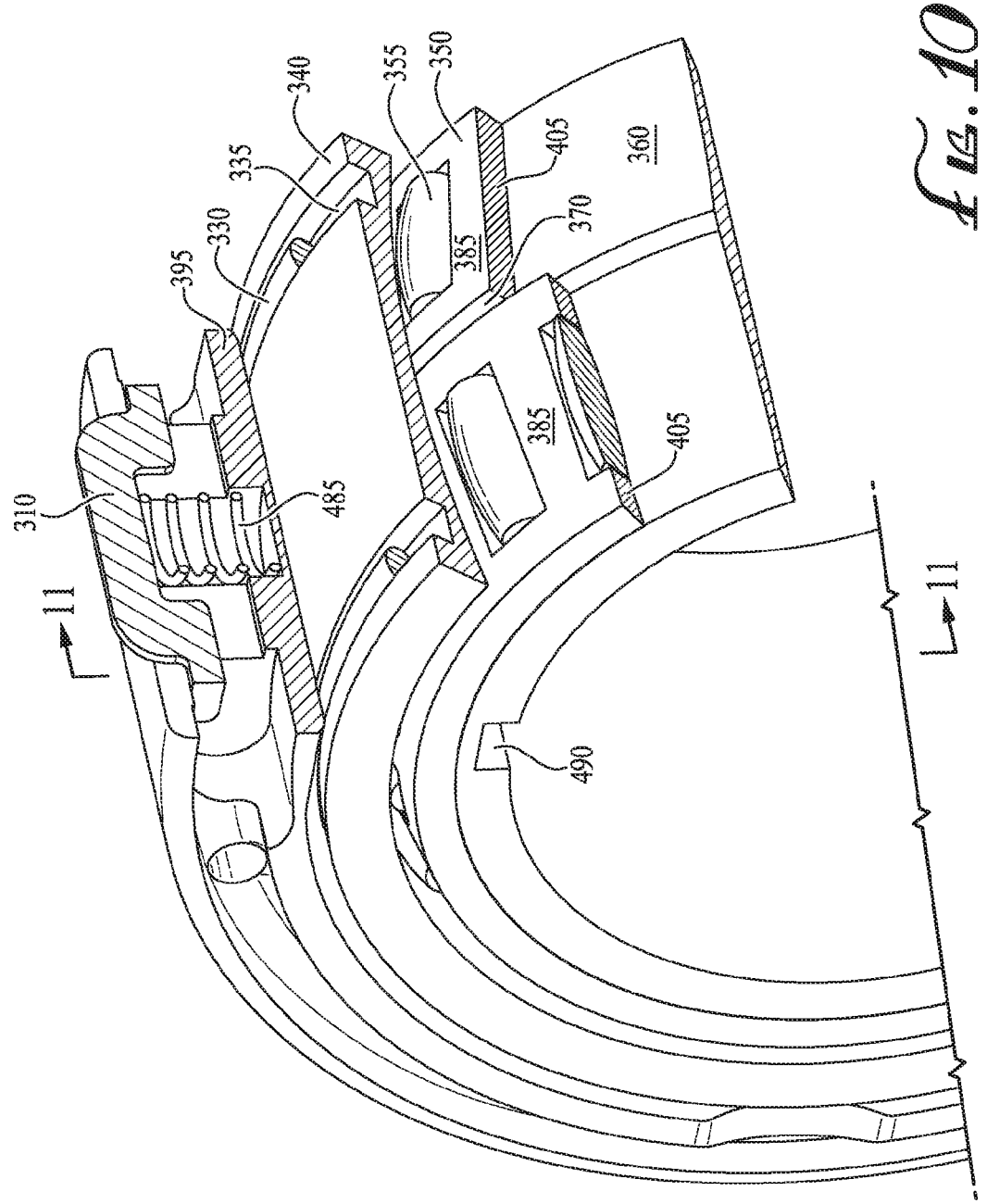
FIG. 10 is a cross sectional view of a radial support bearing of an illustrative embodiment.
Figure 11:
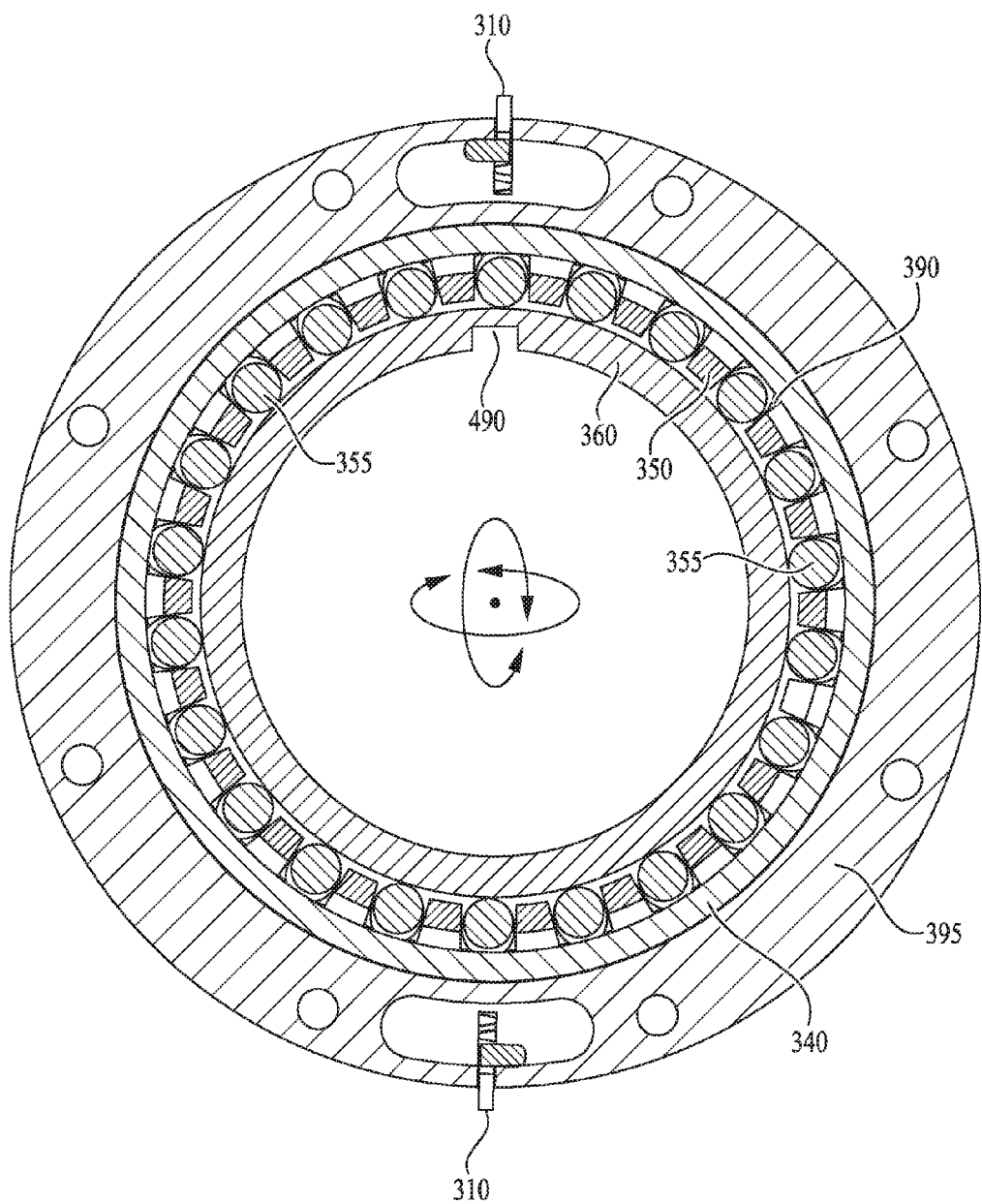
FIG. 11 is a cross sectional view across line 11-11 of FIG. 10 of a radial support bearing of an illustrative roller embodiment.

Roller cage 350 may be composed of two hemispheres 385 attached and/or coupled to each other at and/or proximate equator 370 to form a "spherical" bearing comprising rollers 355. The radius (distance from shaft 110 to OD) of hemispheres 385 may decrease symmetrically moving in an axial direction away from equator 370. Rollers 355 may rotate freely within tapered roller cage 350. The self-leveling aspect of rounded bearing 300 may be achieved by enabling roller cage 350 to rock and/or pivot out of alignment with longitudinal axis 120, rolling inside of ID 480 of outer race 340, as dictated by the movement of shaft 110. This ability to rock, pivot and/or self-align may permit rollers 355 to turn while avoiding fretting corrosion. FIG. 10 and FIG. 11 illustrate additional views of a roller type bearing of illustrative embodiments when assembled.

Figure 6B:
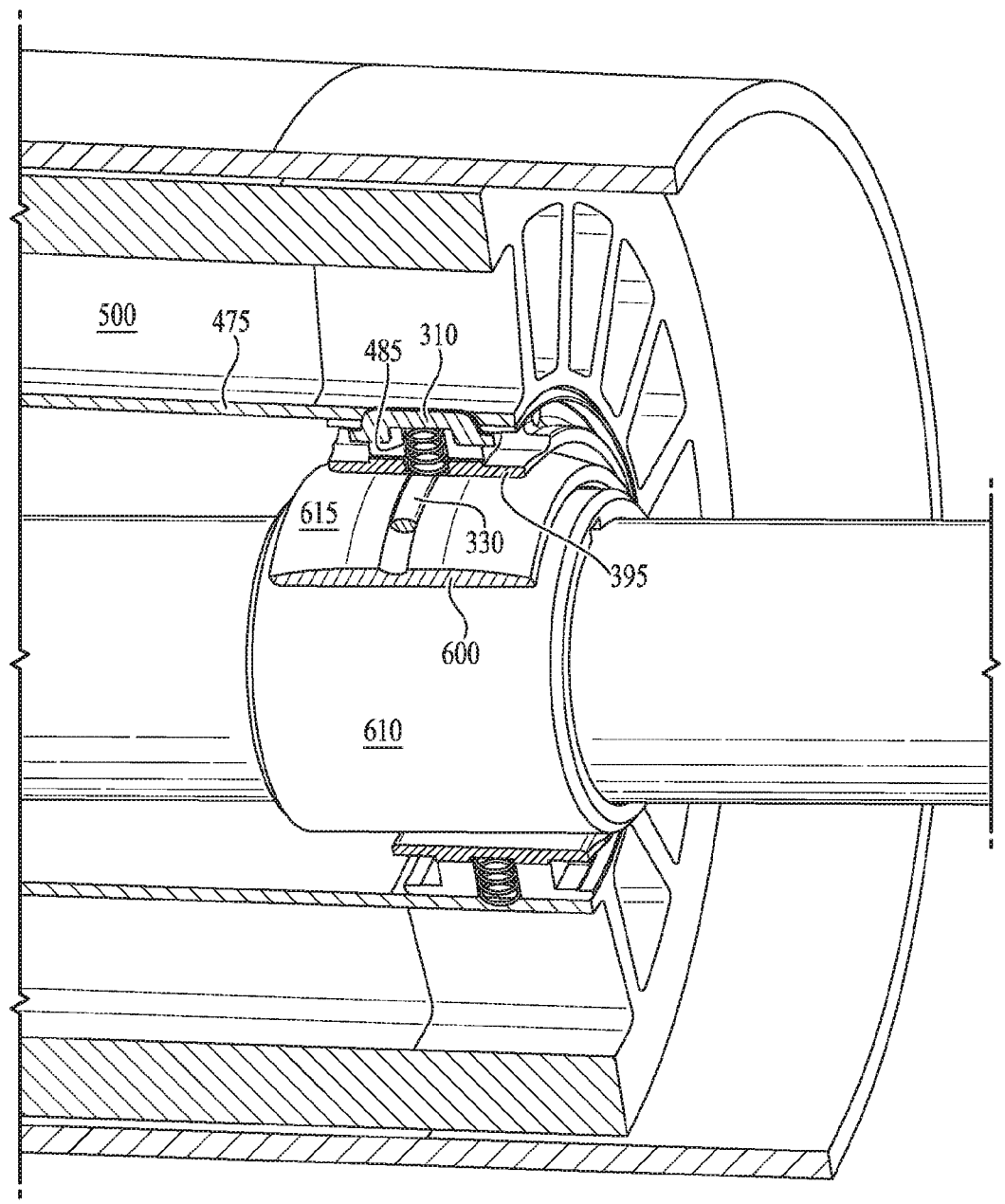
FIG. 6B is a cross-sectional view of an ESP motor with a bearing set of an illustrative embodiment.
Figure 12:
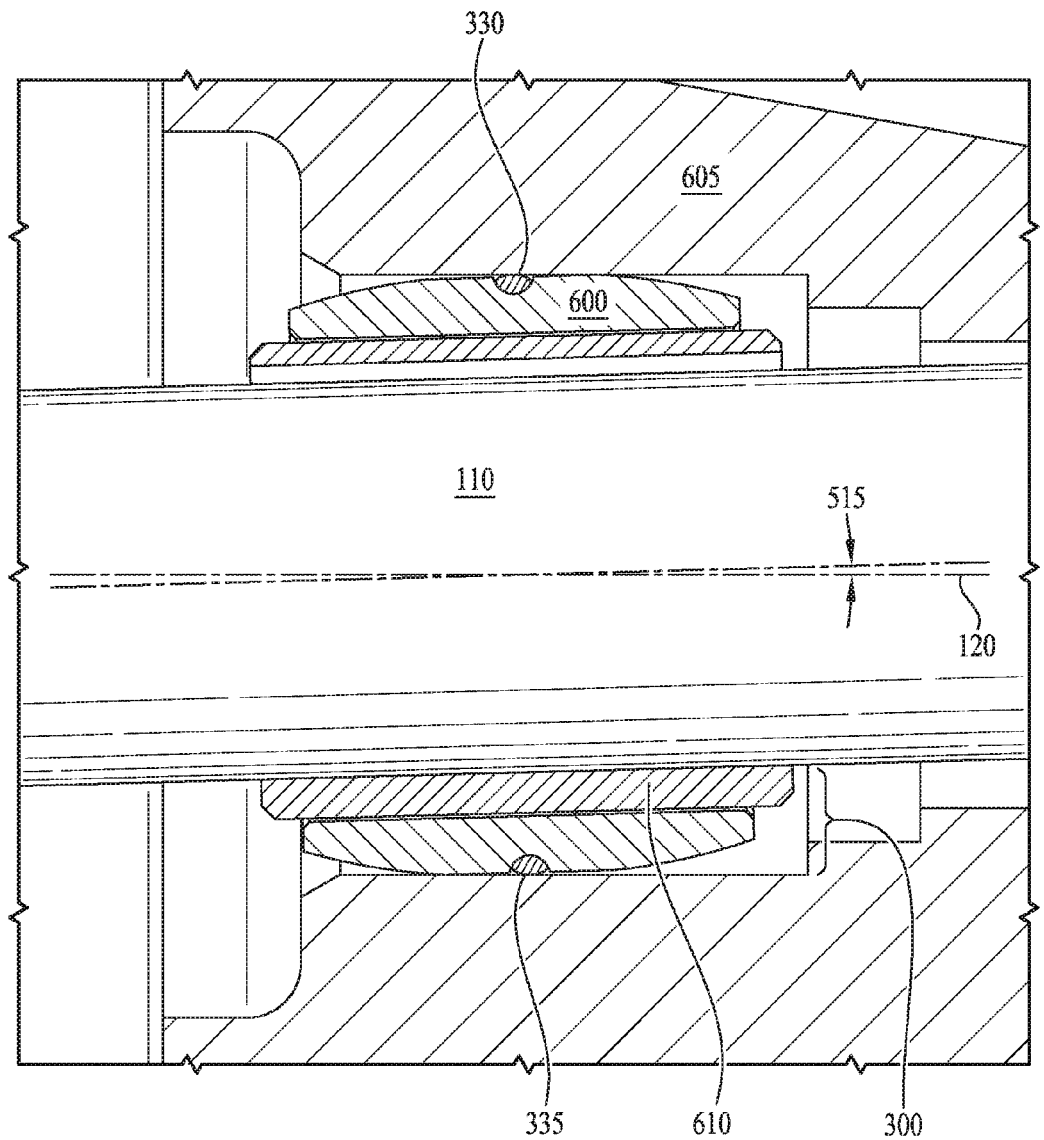
FIG. 12 is a cross sectional view of a bearing set of an illustrative embodiment.

A hydrodynamic type self-aligning bearing 300 is illustrated in FIG. 12. A hydrodynamic style self-aligning bearing 300 capable of rocking into self-alignment may be desirable where there is not sufficient space to accommodate a roller style bearing, or where hydrodynamic propertied are desired. A hydrodynamic self-aligning bearing 300 may be capable of movement around fewer axes than a roller bearing embodiment, however the hydrodynamic self-aligning bearing 300 of illustrative embodiments may rock with enough deflection to support shaft bend 515 of up to 15° per one-hundred feet. A hydrodynamic self-aligning bearing 300 may be employed as a bearing set in motor head 65 or motor base 70, where there is often less than 0.02 inches between shaft 110 and housing 605 of motor head 65 or motor base 70, and thus not enough space for a roller bearing but sufficient space for a hydrodynamic bearing. A hydrodynamic self-aligning bearing 300 may also be employed within carrier 395 as a stator bearing between rotor sections 505, as shown in FIG. 6B.

In one exemplary embodiment shown in FIG. 12, hydrodynamic self-aligning bearing 300 comprises a bearing set including sleeve 610 and rounded bushing 600. Rounded bushing 600 may be inserted into housing 605 of motor head 65 or motor base 70 with one or more elastomeric rings 330 fitted to the outer periphery of rounded bushing 600. As shown in FIG. 12, elastomeric ring 300 is seated in groove 335 located around equator 370 of rounded bushing 600. Sleeve 610 may be keyed and/or secured to shaft 110. Sleeve 610 and shaft 110 may rotate together inside rounded, non-rotating bushing 600. As the equipment bends, rounded bushing 600 may rock with the same degree of bend. This may eliminate any edge loading that might otherwise occur.

Figure 15:
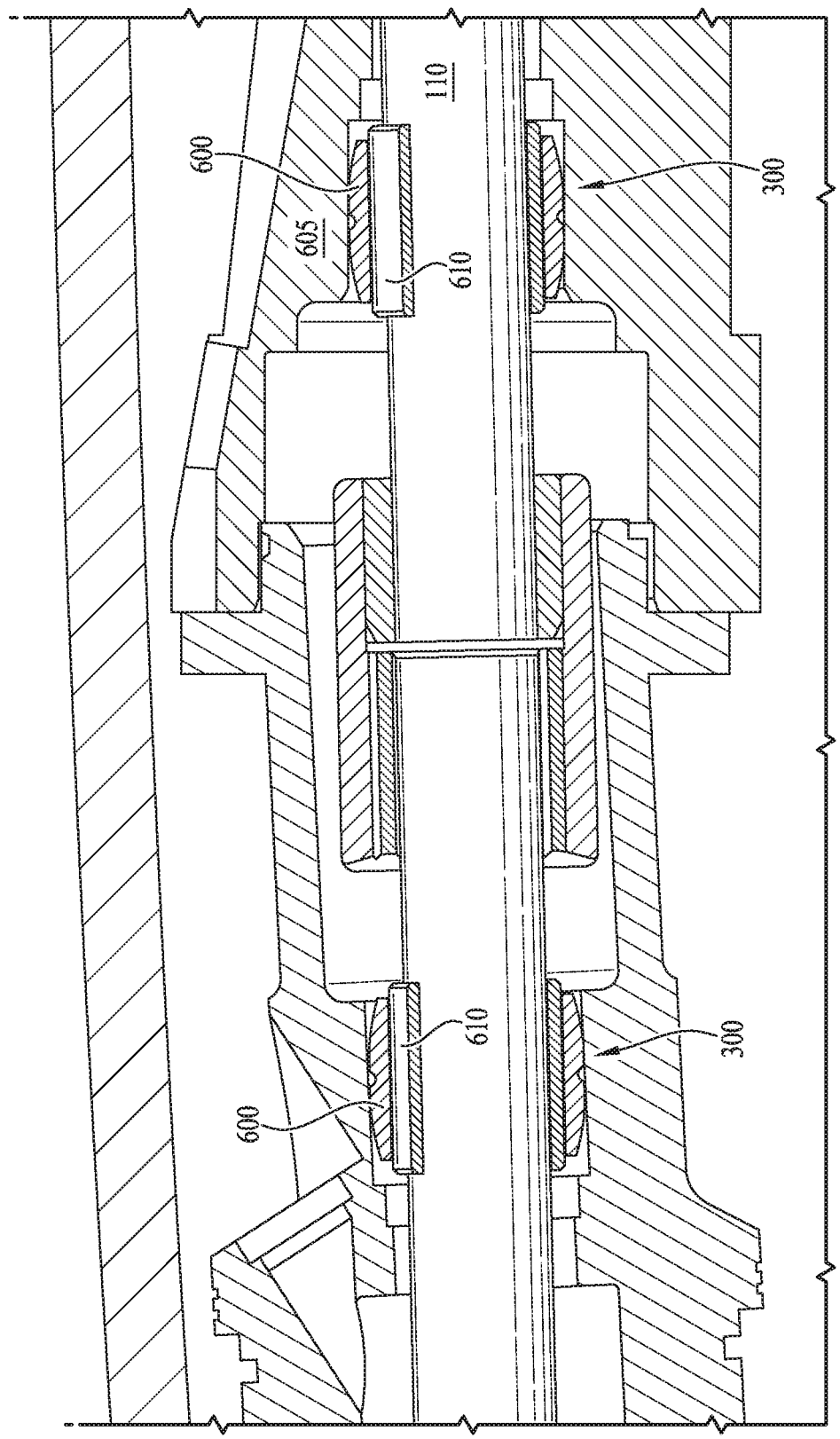
FIG. 15 is a cross-sectional view of a motor head of an illustrative embodiment.

FIG. 13 and FIG. 14 illustrate a rounded bushing 600 of an illustrative embodiment. Together with sleeve 610, rounded bushing 600 may form self-aligning bearing 300 of the hydrodynamic type. As shown in FIG. 13, bushing OD 615 may be rounded and/or curved inwards (towards shaft 110) symmetrically from equator 370 at a slope of 0.15 degrees/foot, where a shaft 110 deflection of 15° per one-hundred feet is desired. Unlike conventional bearings that are shaped like a hollow cylinder having an outer diameter with constant radius in an axial direction, the circumference of bushing OD 615 may decrease away from equator 370 (both upwards and downwards axially) to form a rocker surface, curved similarly to the rockers of a rocking chair or a cradle. In the embodiments illustrated in FIG. 12 and FIG. 15, bushing OD 615 may rock against the surface of housing 605 the way a rocking chair rocks along a flat floor. In the embodiment illustrated in FIG. 6B, bushing OD 615 may rock along carrier ID 800 (shown in FIG. 8). Groove 335 may seat elastomeric ring 330, which may hold bushing 600 stationary against carrier 395 or housing 605 while sleeve 610 rotates within. FIG. 15 illustrates two self-aligning bearings 300 of an illustrative hydrodynamic embodiment in a motor head. Sleeve 610 may be keyed to, and rotate with, shaft 110. FIG. 6B illustrates a hydrodynamic bearing set employing rounded bushing 600 and sleeve 610 in ESP motor 35 between rotor sections 505, secured against carrier 395. As in roller bearing embodiments, carrier 395 may be secured to stator 500 keyway 475 with spring-loaded key 310.

As shown in FIG. 12, shaft 110 has bent upwards to the right forming shaft bend 515. Rounded bushing 600 has rocked along bushing OD 610 in same direction to remain aligned with shaft 110 despite bend 515. Housing 605, along which bushing OD 610 rocks, has remained aligned with longitudinal axis 120.

Since rounded bushing 600 should not rotate, rounded bushing 600 should be secured to housing 605 or carrier 395 in a manner that retains the friction fit between bushing OD 615 and carrier ID 800, or between bushing OD 615 and housing 605, while still permitting rounded bushing 600 to rock to align with bend 515 in shaft 110. Elastomeric ring 330 seated in groove 335 located at equator 370 of rounded bushing 600 may provide the desired feature. The shape of bushing OD 615 may be similar to the shape of roller cage 350 OD as described herein. Bushing OD 615 may be tapered, rounded, curved and/or shaped like a sphere with ends cut off by parallel planes. Rounded bushing 600 may be a hollow cylinder with a tapered OD 615. The diameter of rounded bushing 600 may be largest at equator 370 and symmetrically decrease away from equator 370. As rounded bushing 600 rocks along housing 605 or carrier ID 800, elastomeric ring 330 may remain at least partially in contact with housing 605 or carrier ID 800 to prevent bushing 600 from rotating with sleeve 610.

One of the greatest benefits of using self-leveling bearings in ESP applications is that the motor string and/or ESP assembly cannot only pass through a tighter bend, but may also operate in a bend of as much 15°/100 feet. ESP motors known in the art cannot survive passing through a bend of more than 10°/100 feet, much less actually operate within one.

An electric submersible motor radial support bearing has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An electric submersible motor comprising:
   a stator bore comprising a keyway;
   a carrier secured to the stator bore by a key mated to the keyway;
   a bearing comprising:
      a non-rotating bushing having a curved outer diameter, the curved outer diameter symmetric about an equator of the non-rotating bushing,
      the equator of the non-rotating bushing having a circumferential groove,
      an elastomeric ring seated in the circumferential groove, and
      a sleeve inwards of the non-rotating bushing and keyed to a rotatable motor shaft;
   the non-rotating bushing secured against an inner diameter of the carrier; and
   the elastomeric ring sandwiched between the carrier and the non-rotating bushing.

2. The electric submersible motor of claim 1, further comprising a plurality of rotor sections secured to the rotatable motor shaft, the bearing separating a first rotor section from an adjacent rotor section of the plurality of rotor sections.

3. The electric submersible motor of claim 1, wherein the rotatable motor shaft extends through the stator bore, and the curved outer diameter of the non-rotating bushing is rockable along the inner diameter of the carrier as the rotatable motor shaft bends out of alignment with a longitudinal axis of the stator bore.

4. An electric submersible motor comprising:
   one of a motor head or a motor base comprising a housing;
   a bearing comprising:
      a non-rotating bushing having a curved outer diameter, the curved outer diameter symmetric about an equator of the non-rotating bushing, the equator of the non-rotating bushing having a circumferential groove, an elastomeric ring seated in the circumferential groove, and a sleeve inwards of the non-rotating bushing and keyed to a rotatable motor shaft;

the non-rotating bushing secured against the housing; and the elastomeric ring sandwiched between the housing and the non-rotating bushing.

5. The electric submersible motor of claim 4, wherein the rotatable motor shaft is operatively coupled to a multi-stage centrifugal pump.

6. The electric submersible motor of claim 4, wherein the curved outer diameter curves inward as the outer diameter extends away from the equator of the non-rotating bushing.

7. An electric submersible motor comprising:
a motor head comprising a housing;
a bearing comprising:
a non-rotating bushing having a curved outer diameter, the curved outer diameter symmetric about an equator of the non-rotating bushing,
the equator of the non-rotating bushing having a circumferential groove,
an elastomeric ring seated in the circumferential groove, and
a sleeve inwards of the non-rotating bushing and keyed to a rotatable motor shaft;
the non-rotating bushing friction fit against an inner diameter of the housing by the elastomeric ring; and
the curved outer diameter of the non-rotating bushing rockable along the inner diameter of the housing as the rotatable motor shaft bends.

8. The electric submersible motor of claim 7, further comprising:
a motor base comprising a second housing;
a second non-rotating bushing of a second bearing friction fit against an inner diameter of the second housing by a second elastomeric ring; and
the curved outer diameter of the second non-rotating bushing rockable along the inner diameter of the second housing as the rotatable motor shaft bends.

* * * * *